United States Patent
Bayer et al.

(10) Patent No.: US 7,331,533 B2
(45) Date of Patent: Feb. 19, 2008

(54) THERMOPLASTIC RAILROAD CROSS-TIES

(75) Inventors: John C. Bayer, Covington, LA (US); Thomas C. Gandolfo, Covington, LA (US)

(73) Assignee: Compositech, L.L.C., Fort Worth, TX (US)

( * ) Notice: Subject to any disclaimer, the term of this patent is extended or adjusted under 35 U.S.C. 154(b) by 212 days.

(21) Appl. No.: 10/806,026

(22) Filed: Mar. 22, 2004

(65) Prior Publication Data

US 2005/0113492 A1 May 26, 2005

Related U.S. Application Data

(63) Continuation of application No. 09/370,062, filed on Aug. 24, 1999, now abandoned, which is a continuation-in-part of application No. 09/128,216, filed on Aug. 3, 1998, now abandoned, which is a continuation-in-part of application No. PCT/US98/16167, filed on Aug. 3, 1998, which is a continuation-in-part of application No. 09/022,226, filed on Feb. 11, 1998, now Pat. No. 6,001,491, which is a continuation-in-part of application No. 08/611,911, filed on Mar. 6, 1996, now abandoned, and a continuation-in-part of application No. 08/843,823, filed on Apr. 21, 1997, now Pat. No. 5,799,870.

(51) Int. Cl.
 *E01B 9/14* (2006.01)
(52) U.S. Cl. .................. 238/84; 238/85; 264/177.2
(58) Field of Classification Search .............. 238/84, 238/85; 264/177.2
 See application file for complete search history.

(56) References Cited

U.S. PATENT DOCUMENTS

| | | | |
|---|---|---|---|
| 2,985,617 A | 5/1961 | Salyer et al. |
| 3,933,731 A | 1/1976 | Machi et al. |
| 4,070,201 A | 1/1978 | Tessenske |
| 4,083,491 A | 4/1978 | Hill |
| 4,108,377 A | 8/1978 | Potter |
| 4,113,177 A | 9/1978 | Collins et al. |
| 4,134,546 A | 1/1979 | Dankert |
| 4,150,790 A | 4/1979 | Potter |
| 4,160,761 A | 7/1979 | Prusinski et al. |
| 4,165,302 A | 8/1979 | Armenti et al. |
| 4,286,753 A | 9/1981 | Lee |
| 4,925,094 A | 5/1990 | Buekett |
| 5,055,350 A | 10/1991 | Neefe |
| 5,128,397 A | 7/1992 | Horsey et al. |
| 5,525,679 A | 6/1996 | Effler, Jr. et al. |
| 5,609,295 A | 3/1997 | Richards |
| 5,635,266 A | 6/1997 | Quinn et al. |
| 5,658,519 A | 8/1997 | March et al. |
| 5,916,932 A | 6/1999 | Nosker et al. |

*Primary Examiner*—Bernard Lipman
(74) *Attorney, Agent, or Firm*—Garvey, Smith, Nehrbass & North, L.L.C.; Seth M. Nehrbass; Jacqueline M. Daspit

(57) ABSTRACT

A process is provided for making thermoplastic-composites from recycled thermoplastics (polyolefins) together with phosphogypsum waste by-product from the phosphate fertilizer wet process or, in an equally preferred embodiment with fluorogypsum waste by-product from fluorine production wet process to produce lumber profiles. The process involves (a) admixing phosphogypsum (calcium sulfate) and/or fluorogypsum (calcium fluoride) waste byproduct and/or Flue Gas Desulfurization (FGD) gypsum and/or crude gypsum and/or calcined gypsum with thermoplastics and a functionalized compound with or without coupling agents to produce a filled thermoplastic-composite composition, and (b) melt processing the composition to produce a filled thermoplastic-composite article. The articles are preferably in the form of railroad cross ties or construction articles such as common lumber profiles, panels, tiles, poles, utility poles, crossarms for utility poles, roofing tiles, pipeline skids, pilings, marine fender-piles (including light emitting piles), bulkheads, revetments, and are useful for constructing various structures, such as oilfield board roads and equipment mats. The process avoids the accumulation of undesired phosphogypsum/fluorogypsum "stacks" and provides environmentally friendly useful products which require no chemical preservatives to prevent insect infestation or decay from the elements. Tailings from ore processing can also be used as a filler.

19 Claims, 8 Drawing Sheets

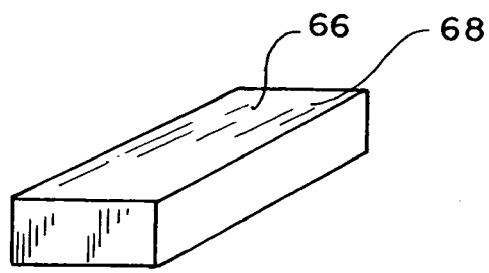
F I G . 4
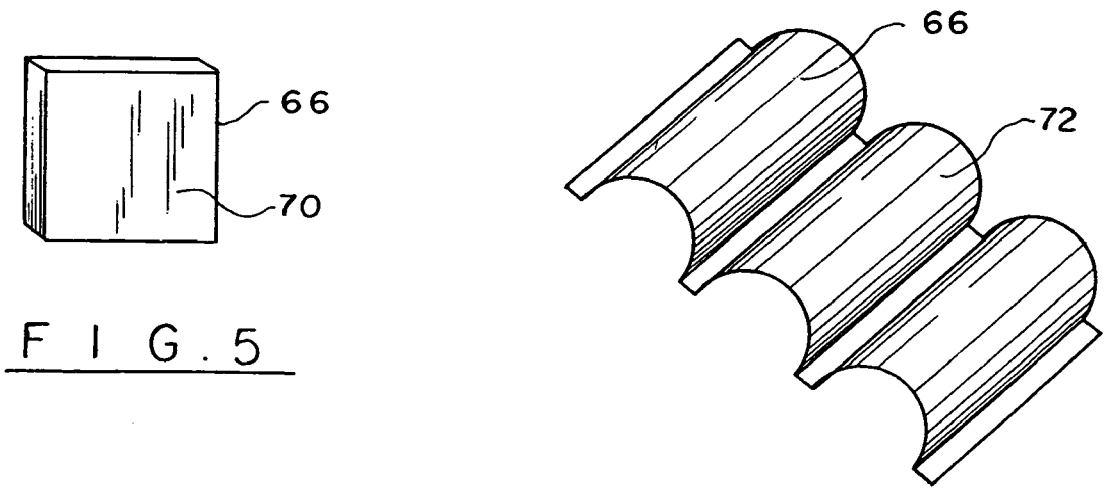
F I G . 5
F I G . 6
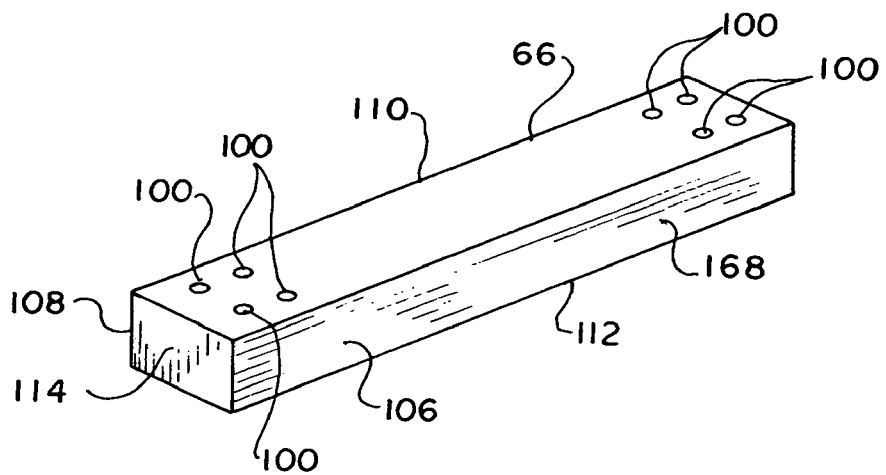
F I G . 7

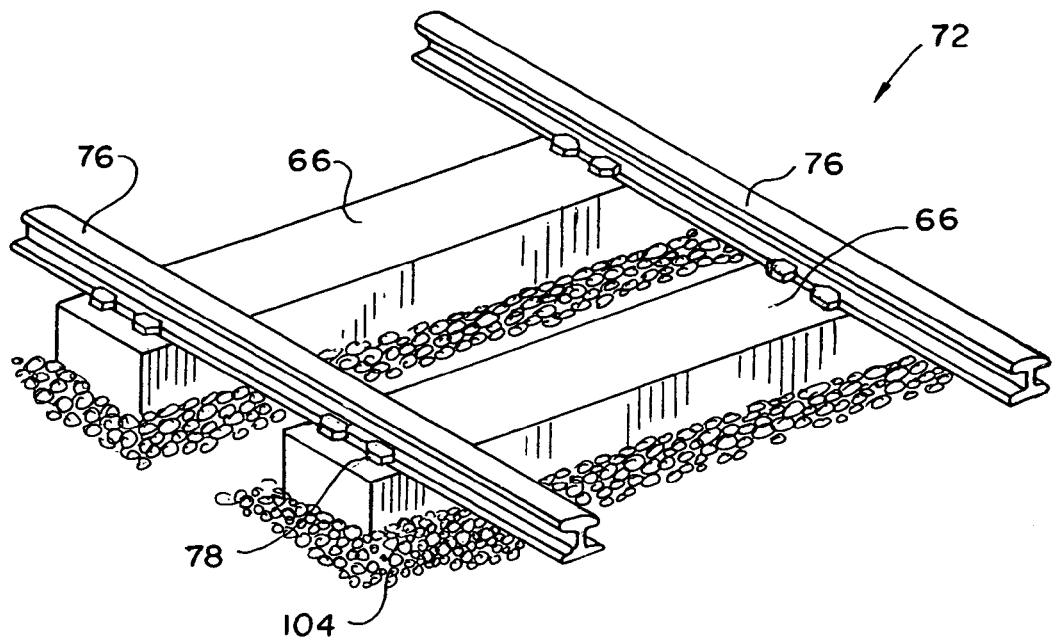
F I G. 8
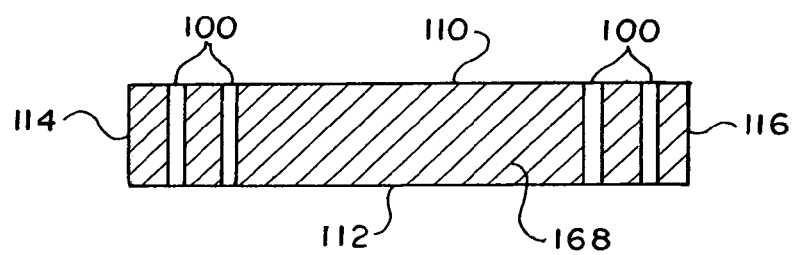
F I G. 9
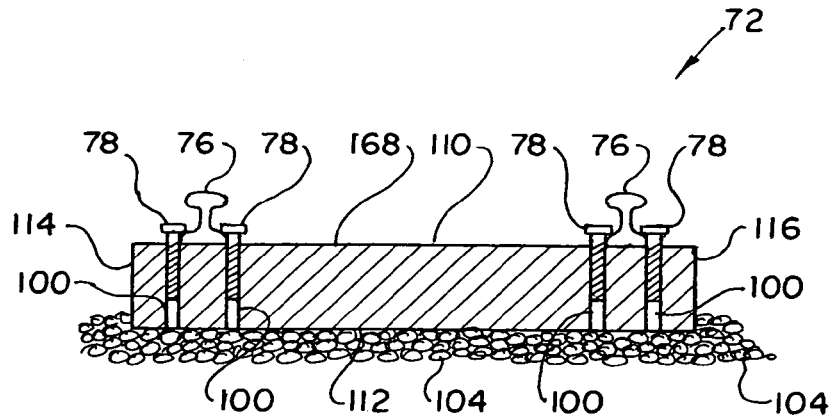
F I G. 10

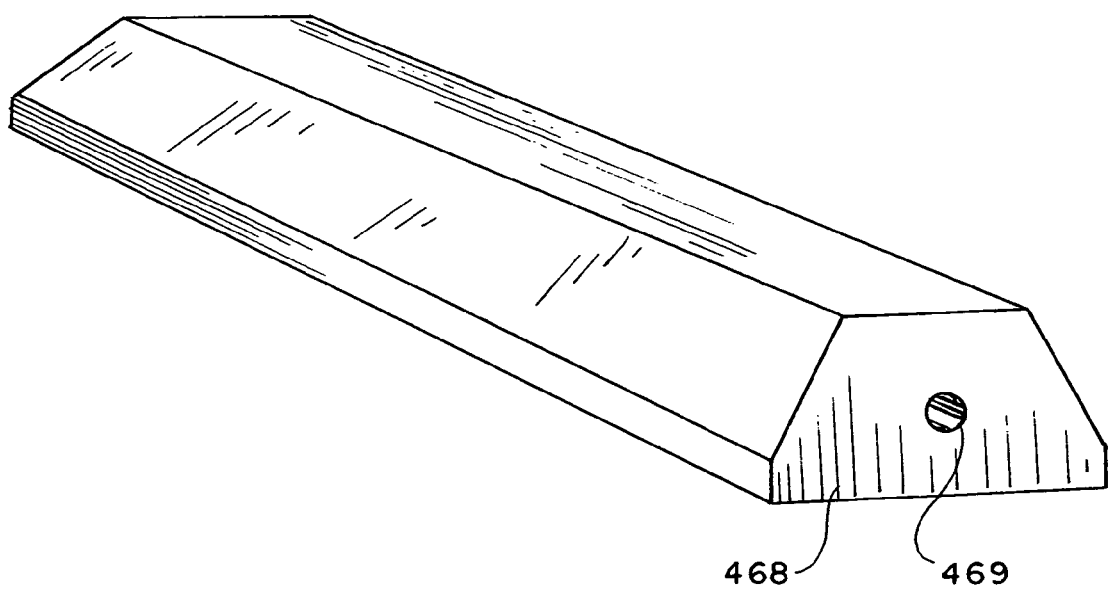
F I G. 11
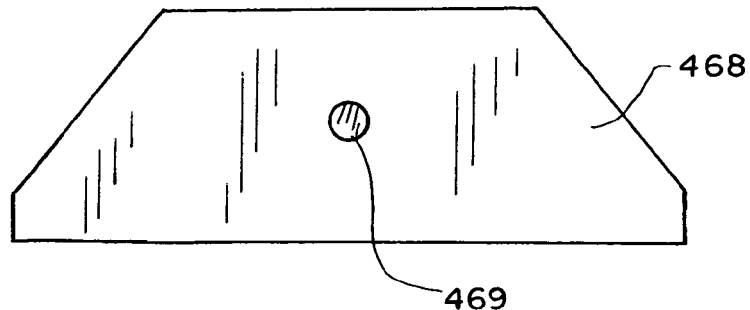
F I G. 12
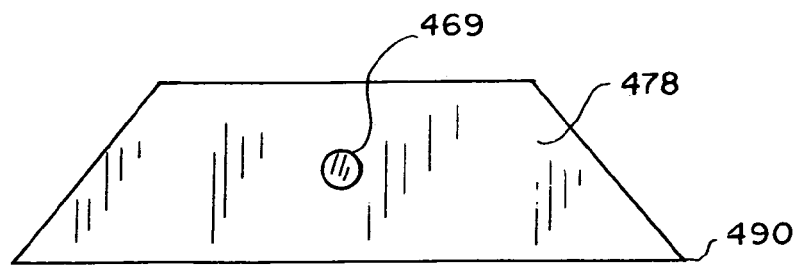
F I G. 13

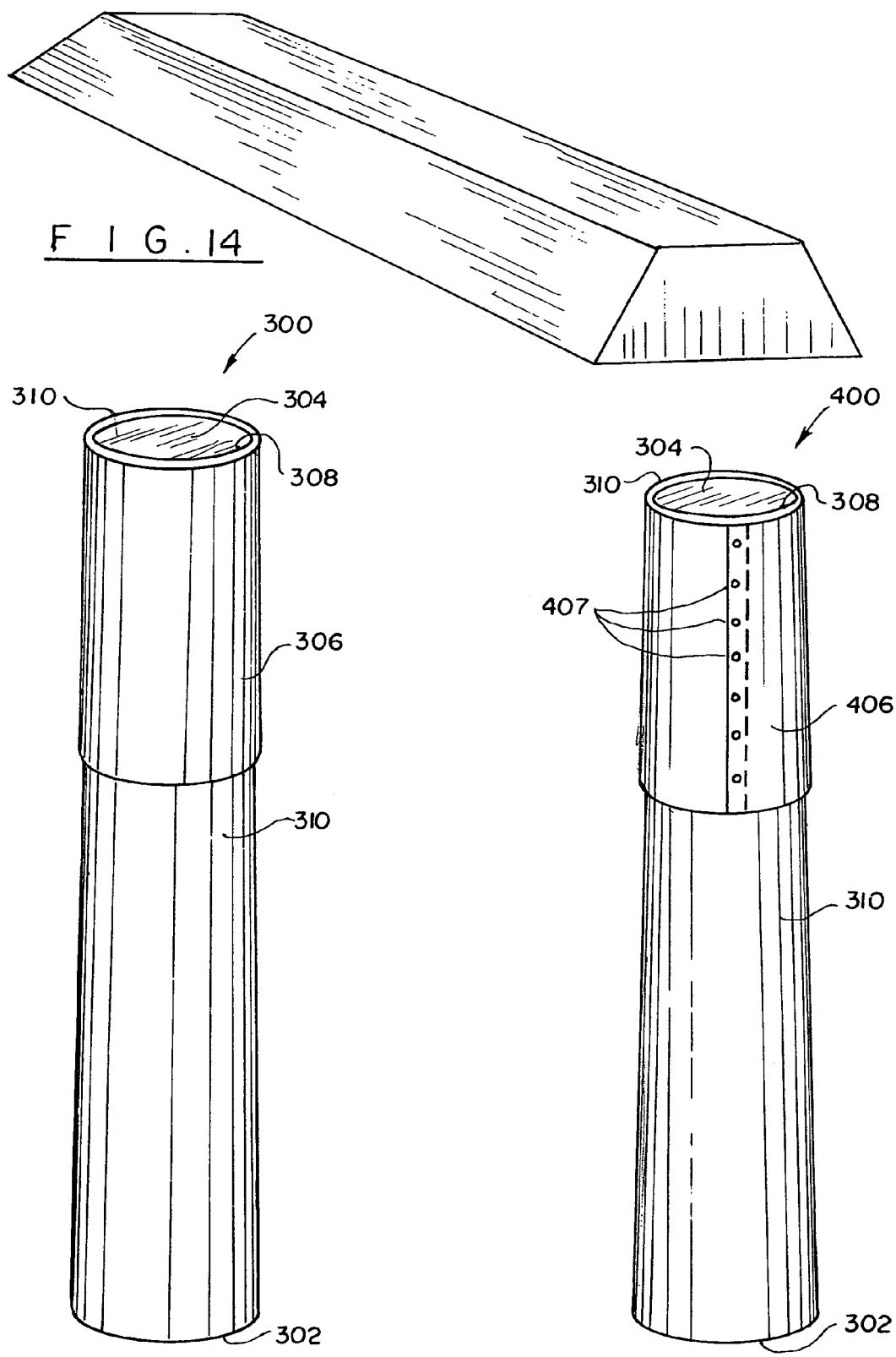

THERMOPLASTIC RAILROAD CROSS-TIES

CROSS-REFERENCE TO RELATED APPLICATIONS

This is a continuation of U.S. patent application Ser. No. 09/370,062, filed 24 Aug. 1999 now abandoned, which is a continuation-in-part of U.S. patent application Ser. No. 09/128,216, filed 3 Aug. 1998 now abandoned, which is a continuation-in-part of U.S. patent application Ser. No. 08/611,911, filed 6 Mar. 1996 now abandoned, and which is a continuation-in-part of U.S. patent application Ser. No. 08/843,823, filed 21 Apr. 1997 now U.S. Pat. No. 5,799,870, and which is a continuation-in-part of U.S. patent application Ser. No. 09/022,226, filed 11 Feb. 1998 now U.S. Pat. No. 6,001,491; this is also continuation-in-part of co-pending International Patent Application No. PCT/US98/16167, filed 3 Aug. 1998; all of these applications are incorporated herein by reference.

REFERENCE TO A "MICROFICHE APPENDIX"

Not applicable

BACKGROUND OF THE INVENTION

1. Field of the Invention

STATEMENT REGARDING FEDERALLY SPONSORED RESEARCH OR DEVELOPMENT

Not applicable

The present invention relates to processes for manufacturing fertilizers and plastic articles, and more particularly relates to processes for manufacturing phosphorous containing fertilizers and filled plastic articles.

The present invention also relates to froth flotation processes and plastic articles, and more particularly relates to processes for producing mineral filled thermoplastic composites and articles made therefrom.

The present invention also relates to thermoplastic railroad ties and processes for making thereof, and more particularly relates to thermoplastic composite railroad ties and processes for making thereof.

The present invention also relates to protective pilings and processes for making pilings, and more particularly relates to pilings and processes for making pilings.

2. General Background of the Invention

In the fertilizer industry, materials used as sources of calcium and phosphorous are ground in mills and sifted to produce fine particles. For example, phosphate rock is ground to produce phosphate particles to be worked into the soil or for further processing with acids for the manufacture of fertilizers. A conventional process for using phosphate rock in the fertilizer industry involves a wet process wherein the phosphate rock, $Ca_3(PO_4)_2$, is contacted with sulfuric acid and a byproduct of calcium sulfate is removed as phosphogypsum ($CaSO_4.2H_2O$) or hemihydrate ($CaSO_4.1/2H_2O$) with residual levels of phosphate in the byproduct. In other words, the wet process waste byproduct typically comprises amounts of calcium sulfate and smaller amounts of di-calcium phosphate. Additionally, the presence of small amounts of fluorine-containing compounds provides a byproduct that is sometimes referred to as fluorogypsum. The byproducts have had limited commercial utility, and accordingly have been at times stock piled as undesired waste product.

Consequently, there is a need and desire to provide processes which solve the problems associated with wet process solid waste byproducts. Also, there is a need and desire to provide useful articles comprising these byproducts. The utilization of two (2) wastes ("Twining") to produce safe and useful products is referred to as "Beneficial Use" by the United States Environmental Protection Agency (U.S. EPA).

In the mineral industry, mineral ores used as sources of minerals are typically ground in mills near or at the mine site and sifted to produce fine particles which are subjected to froth flotation to produce concentrates of valuable minerals. For example, metallic sulfide ores of copper, lead, zinc, nickel and molybdenum are ground to produce particles which are subjected to froth flotation where the valuable minerals concentrate in the froth leaving an underflow product as waste. A conventional process for concentrating metallic sulfide ores by froth flotation involves (a) grinding the ore to produce particles, (b) treating the particles with a floatation reagent to render the particulates air-avid and water repellant, (c) vigorously agitating and aerating the particles in the presence of water to produce a layer of froth containing air-avid particles and (d) collecting the froth. Valuable concentrations may be either in the froth or in the underflow, but in process involving metallic sulfide ores of copper, lead, zinc, nickel and molybdenum, the valuable minerals concentrate in the froth.

Problems however have been associated with the processes. For example, after the valuable minerals have been removed by the Froth Flotation method, tailings such as calcium carbonate, silica, fluorspar, barium sulfate zinc, lead and molybdenum are stacked or stockpiled. Particularly in the case of lead and molybdenum tailings, there is increasing environmental concerns with the repeated exposure of such tailings to wind and rain resulting in runoffs into rivers, lakes and groundwater.

Consequently, there is an urgent need for safely containing tailings resulting from the Froth Flotation processes and a need to avoid lead and molybdenum contaminated runoff from tailing.

A process is provided for processing ore and for making plastic articles from the solid byproducts therefrom. The process involves (a) providing ore, (b) contacting the ore with reagent in the presence of water to produce coated metallic sulfide particulates, (c) Froth Flotation of the coated particulates, (d) separating at least a portion of the froth from the underflow to produce a flotation product and a tailing byproduct wherein the tailing byproducts typically comprising calcium carbonate, silica, fluorspar, barium sulfate, zinc and lead, (d) drying the tailing byproduct to remove water therefrom, (e) admixing the dried tailing byproduct with thermoplastic and preferably a functionalized compound to produce a filled thermoplastic composition, and (f) melt processing the thermoplastic composition to produce a filled thermoplastic article. The articles are preferably in the form of block shaped articles such as car stops, railroad ties, pilings, poles and timbers suitable for retaining walls and bulkheads. The process avoids the accumulation of undesired tailing byproduct from flotation processes.

In the railroad industry, the railroad tracks comprise metal rails supported on wooden ties. Historically, these wooden ties have exhibited limited useful lives due to their loss of properties upon extended use and extended exposure to environmental elements. The use of composite railroad ties has been disclosed in Neefe U.S. Pat. No. 5,055,350 issued Oct. 8, 1991 which discloses the making of railroad cross-ties from sand and recycled thermoplastic containers by coating the sand with an adhesive substance. The use of sand however can have various problems or disadvantages associated therewith including excessive weight, excessive abrasiveness when used in extrusion processes and when in contact with various processing equipment. Consequently, there is a need and a desire to provide composite railroad ties exhibiting certain enhanced properties.

A composite railroad tie is provided comprising a phosphogypsum filler and a thermoplastic resin. The composite exhibits desirable physical properties for railroad ties. Suitable sources for phospho-gypsum include fertilizer processes involving (a) providing phosphate rock, (b) contacting the phosphate rock with sulfuric acid in the presence of water to produce phosphoric acid and a calcium sulfate, (c) separating at least a portion of the phosphoric acid from the calcium sulfate to produce a phosphoric acid product and a calcium sulfate byproduct, (d) drying the calcium sulfate byproduct to remove water therefrom. The calcium sulfate byproduct (phospho-gypsum) is then admixed with a thermoplastic and a functionalized compound to produce a filled thermoplastic composition. The filled thermoplastic composition is then melt processed (for example injection or compression molded) to produce a filled thermoplastic composite railroad tie. The tie is a useful replacement for wood products having several physical property advantages and being suitably made from recycled plastic and waste byproduct filler.

In the shipping industry, the ships (barges) traveling on narrow waterways such as rivers and bays need to pass under bridges and adjacent to bridge supports and other structures. Historically, these bridge supports have been damaged by accidental ramming and rubbing by heavily loaded ships and barges resulting in undesired damage to the bridges thereby reducing the useful lives of such bridges and structures, and such ships have also been damaged as a result of such undesired contact with the structures. Prior efforts to protect bridges and structure have included the use of protective outer wood pilings which are placed around the structure and banded or bolted together (clustered) to provide a protective outer layer. The use of marine fenders has been disclosed in various patents, see for example Young U.S. Pat. No. 4,281,610 issued Aug. 4, 1981 which discloses a marine fender comprising a sheet of resilient material and an elastomeric core; Nill U.S. Pat. No. 5,037,242 which discloses a dock fender made of PVC pipe; Matthews U.S. Pat. No. 3,950,953 issued Apr. 20, 1976 which discloses a piling fender; Smath U.S. Pat. No. 4,804,296 issued Feb. 14, 1989 which discloses a floatable marine fender device; James U.S. Pat. No. 5,007,363 issued Apr. 16, 1991 which discloses a buoyant marine fender; Watkins U.S. Pat. No. 5,013,272 issued May 7, 1991 which discloses a boat fender made of flexible plastic and having a hollow interior; Stevens U.S. Pat. No. 5,018,471 issued May 28, 1991 which discloses a marine fender for pilings of marine structures, all of which are incorporated herein by reference. These various prior fenders exhibit one or more of the following problems: (a) they are not easily visible at night (low light conditions) resulting in them not providing warning to the ship (barge) approaching the structure and/or (b) they exhibit floating characteristics, and other characteristics, which make it difficult to use them as pilings or as mostly submerged fenders.

Consequently, there is a need and a desire to provide pilings which exhibit certain improved characteristics such as improved visibility and improved density characteristics.

A composite marine piling is provided comprising (a) a core element comprising filler and a thermoplastic resin and (b) a sheath comprising thermoplastic resin and a light absorbing/emitting material. The filled thermoplastic composition of the core element is melt processed (for example injection or compression molded) to produce the filled thermoplastic composite marine piling core element. The sheath covers top of the core element to provide the top portion of the piling with a light emitting (luminescent) sheath to enhance the visibility of the piling to ship operators. The piling is a useful replacement for wood pilings and has several physical property advantages and preferably being suitable made from recycled plastic and waste byproduct filler.

The following U.S. Patents are incorporated herein by reference:

U.S. Pat. Nos. 3,636,713; 3,995,434; 4,248,760; 5,030,662; 5,344,490; 5,683,616; all patents and other references cited herein or in the file histories of any parent patent application.

U.S. Pat. No. 5,396,799 is incorporated herein by reference. Said referenced patent provides for the non-destructive evaluation of the integrity of wooden members. The present invention will utilize the technology inculcated in the patent incorporated herein by reference but instead of its application to wooden members, said technology will be applied to the thermoplastic-composite members inculcated in the present invention.

BRIEF SUMMARY OF THE INVENTION

The present invention solves the problems confronted in the art in a simple and straightforward manner. What is provided is a process for making fertilizer from phosphate rock and for making plastic articles from the solid byproducts therefrom. The process preferably involves (a) providing phosphate rock (calcium phosphate), (b) contacting the phosphate rock with sulfuric acid in the presence of water to produce phosphoric acid and a calcium sulfate, (c) separating at least a portion of the phosphoric acid from the phosphate rock to produce a phosphoric acid product and a calcium sulfate byproduct, (d) drying the calcium sulfate byproduct to remove water therefrom, (e) admixing the calcium sulfate byproduct with a thermoplastic, preferably a recycled polyolefin, and a functionalized compound to produce a filled thermoplastic composition, and (f) melt processing (e.g., injection or compression molding) said thermoplastic composition to produce a filled thermoplastic article. The articles are preferably in the form of construction articles such as plastic lumber, plastic panels, plastic tiles, railroad ties, and marine pilings. The plastic effectively encapsulates (traps, reduces escape of) undesired radon gases and attenuates certain radiation which may be present in the byproduct.

Another embodiment of the present invention is a process for making metallic concentrate from metallic ore and for making plastic articles from the tailings therefrom. The process preferably involves (a) providing metallic ore, (b) grinding the ore to produce particles, (c) treating the particles with a floatation reagent to render the particulates air-avid and water repellant, (d) vigorously agitating and aerating the particles in the presence of water to produce a layer of froth containing air-avid particles, (e) collecting the froth, (f) collecting the underflow, (g) removing the tailings from the underflow, (h) drying the tailings to produce a dry particulate material comprising amounts of calcium carbonate, silica, fluorspar, barium sulfate, zinc and lead and other trace metals (i) binding the particulates in a thermoplastic resin to produce a mineral filled composition, and (j) forming a thermoplastic article from the composition. The articles are preferably in the form of elongated blocks suitable as car stops, railroad ties or if utilized in combination as a seawall or sound barrier.

Another embodiment of the present invention for producing various thermoplastic articles or profiles (shapes) is the utilization of Flue Gas Desulfurization Gypsum (FGD Gypsum), and/or crude, calcined or byproduct gypsum as fillers together with various combinations of polyolefin resins. Flue Gas Desulfurization (FGD) gypsum is a waste byproduct from the electric utility industry where FGD gypsum is removed from the flue stack scrubbers of coal fired plants. Crude gypsum (calcium sulfate) can be obtained from any of the 58 mines in 19 states in America as well as from over 20 countries abroad. Calcined gypsum can be obtained from any of 14 companies with 73 plants in 27 states in America.

The polyolefin resins are preferably present at a level of from 10 to 99 percent by weight based on the total weight of the composition, more preferably from 25 to 80 percent by weight thereof, and most preferably from 40 to 75 percent by weight thereof. The filler (e.g., crude, calcined or FGD gypsum) is preferably present at a level of from 1 to 90 percent by weight based on the total weight of the composition, more preferably from 20 to 75 percent by weight thereof, and most preferably from 25 to 60 percent by weight thereof. The functionalized compound (epoxidized oil) is preferably present in the composition at a level of from 0.5 to 2 percent by weight based on the total weight of the composition, more preferably from 1 to 5 percent by weight thereof, and most preferably from 2 to 4 percent by weight thereof. The aforementioned crude, calcined and/or FGD gypsum used in the present composition with a virgin and/or recycled high density polyethylene provides a filled thermoplastic composition which exhibits suitable physical characteristics for articles such as thermoplastic-composite panels, tiles, railroad crossties, utility poles, pilings, bulkheads, marine fender piles, various common lumber profiles as well as artificial reefs and fish habitat structures. The composition may further contain graphite and/or calcium sulfate whiskers as reinforcing agents, at levels of from 1 to 20 percent by weight based on the total weight of the composition, more preferably from 2 to 15 percent by weight thereof, and most preferably from 5 to 15 percent by weight thereof.

The present invention also comprises a composite railroad tie comprising a phosphogypsum ($CaSO_4$) filler and a thermoplastic resin. The composite is relatively dense and exhibits desirable physical properties for railroad ties. Suitable sources for phosphogypsum include the fertilizer manufacturing processes mentioned above.

The present invention also comprises a composite piling (which also functions as a fender-pile) comprising (a) a core of a composite comprising (i) a filler and (ii) a thermoplastic resin, and (b) an outer layer (sheath) or coating of light absorbing/emitting (light-responsive) material. The composite is dense and preferably exhibits a density of greater than 1.0 $g/cm^3$, and most preferably 1.4-1.7 $g/cm^3$, though the density can be greater than 2.0 $g/cm^3$. Yet another practical application for this thermoplastic-waste-mineral-tailings-composite material is to provide a substrate, for example, a pole or piling which will glow-in-the-dark as a result of having photoluminescent material either admixed with the thermoplastic-waste-mineral-tailings-composite prior to extrusion or applied or infused on to the outer surface of the extruded substrate or pole contemporaneously by co-extrusion. Suitable fillers are phosphogypsum (calcium sulfate), fluorogypsum (calcium sulfate) Flue Gas Desulfurization (FGD) Gypsum (calcium sulfate), crude gypsum (calcium sulfate), calcined gypsum (calcium sulfate) and the tailings from the Froth Flotation process discussed above often comprised of: Limestone ($CaCO_3$), Silica ($SiO_2$), Fluorspar ($CaF_2$), Barium Sulfate ($BaSO_4$), Zinc Sulfate (ZnS), Lead Sulfate (PbS). Phosphogypsum may be obtained from the fertilizer manufacturing processes mentioned above. An outer layer (sheath) is affixed (adhered) to the core element, and may be created by coextrusion of the core with the outer layer or the outer layer may be separately applied over the core. The outer layer can be melt-mixed with a photoluminescent material (light absorbing/emitting, light responsive).

In instances where additional structural strength is required by a particular commercial use or application of an article produced by the present invention, graphite and/or carbon fibers may be added to the mix formulation. The preferred volume of such re-enforcing material composition in the case of graphite whiskers is in the range of 1% to 15% by weight of the total formula or finished article weight and most preferably 3% to 8% and, in the case of carbon fibers, in the range of 1% to 10% by weight of the total finished article and most preferably 2% to 6% of total article weight. Such carbon fibers can be obtained, for example, from Fortafil Fibers of Knoxyille, Tenn.

In yet another high structural strength embodiment, commercially available Cenospheres may be used to impart high performance physical properties to the various composite articles of the present invention. In applications requiring lighter articles, Cenospheres can reduce density (and weight) and reduce shrinkage while adding strength and thermal stability. In such high performance cases where this option is called for, the volume of such re-enforcing material may be added to the composite in the range of 1% to 15% by weight of the total finished article and most preferably 3% to 8%. Said Cenospheres can be obtained, for example, from Potters Industries of Valley Forge, Pa.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 4 is a perspective view of an article of the present invention in the shape of a stick of lumber;

FIG. 5 is a perspective view of an article of the present invention in the shape of a sheet;

FIG. 6 is a perspective view of an article of the present invention in the shape of a roofing tile;

FIG. 7 is a perspective view of a composite railroad tie of the present invention;

FIG. 8 is a perspective cutaway view of a railway according to the present invention; and FIG. 9 is a vertical cross-sectional view of the railroad tie of FIG. 1;

FIG. 10 is a vertical cross-sectional cutaway view of railway of FIG. 8;

FIGS. 11 and 12 show a first alternative embodiment of a railroad cross tie having an optional longitudinally extending cooling hole;

FIGS. 13 and 14 show a second alternative embodiment of a railroad cross tie;

FIG. 15 is a perspective view of a composite piling of the present invention;

FIG. 16 is a perspective view of an alternative embodiment of the composite piling of the present invention;

DETAILED DESCRIPTION OF THE INVENTION

Figure 1:
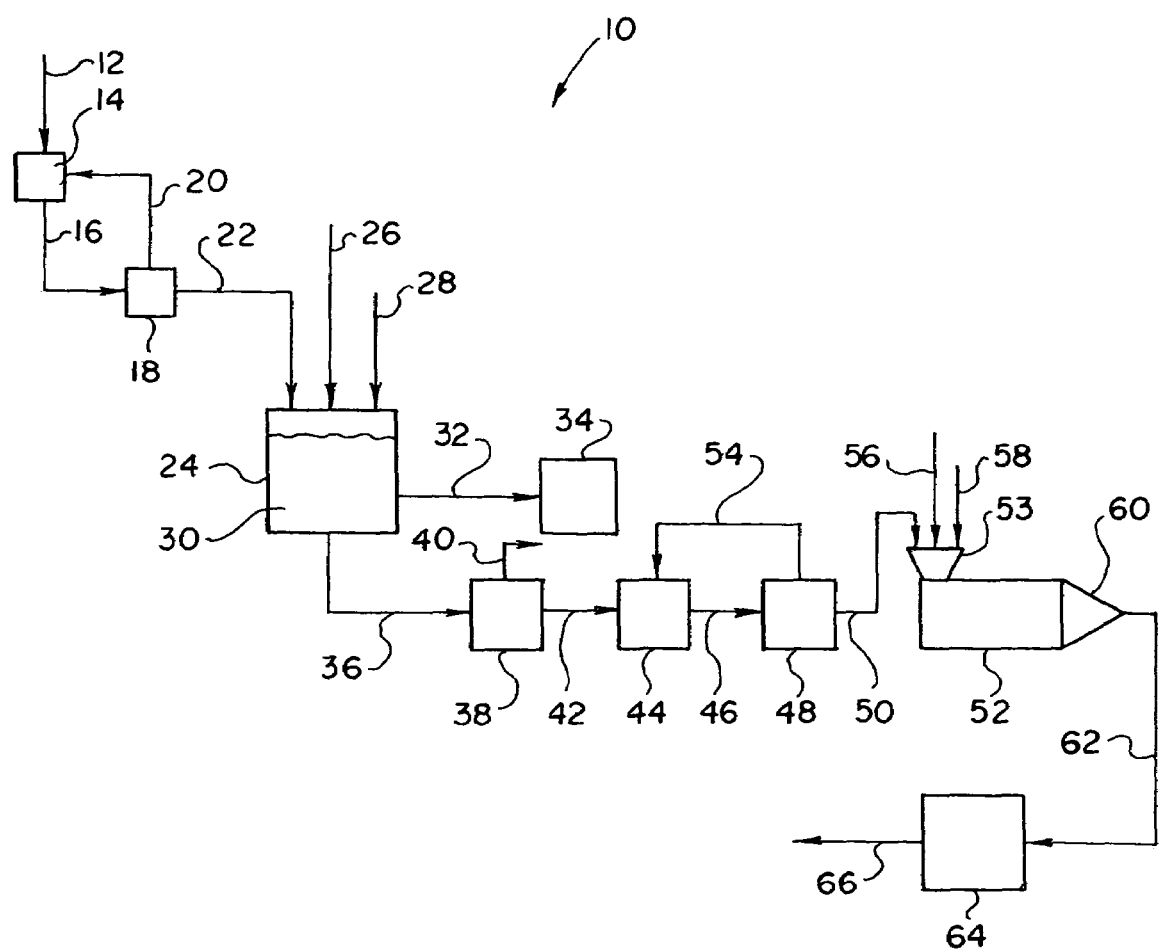
FIG. 1 is a schematic of a wet process for making fertilizer from phosphate rock and for making plastic articles from the solid byproducts therefrom.

A process is provided for manufacturing fertilizer and utilizing the byproducts therefrom. The process involves (a) providing phosphate rock, (b) contacting the phosphate rock with sulfuric acid in the presence of water to produce phosphoric acid and a calcium sulfate byproduct, (c) separating at least a portion of the phosphoric acid from the calcium sulfate to produce a phosphoric acid product and a calcium sulfate byproduct, (d) drying the calcium sulfate byproduct to remove water therefrom, (e) admixing the calcium sulfate byproduct with a thermoplastic resin and a functionalized compound to produce a filled thermoplastic composition, and (f) melt processing the thermoplastic composition, preferably a recycled polyolefin resin, to produce a filled thermoplastic article. The thermoplastic composition comprises (a) a thermoplastic resin, (b) a filler comprising a calcium sulfate compound and a phosphate, and (c) a functionalized compound. Articles formed from the compositions are useful in the manufacture of structures, such articles include plastic lumber, plastic panels, plastic tiles, railroad ties, poles, and marine pilings.

Manufacturing of fertilizers from phosphate rocks by wet processes are well known. The processes involve (a) providing phosphate rocks and converting (reducing the size of) phosphate rocks into phosphate particulates, preferably by grinding, and preferably involves converting phosphate rocks having weight average diameter particle sizes of greater than 0.1 inches (0.254 cm) to small particulates having sizes of less than 0.01 inches (0.254 mm), more preferably less than 0.005 inches (0.013 mm), and most preferably less than 0.003 inches (0.076 mm), for example into a weight average diameter particulate size of no greater than 60 mesh (0.42 mm), more preferably no greater than 115 mesh (0.22 mm), and most preferably no greater than 200 mesh (0.13 mm). The smaller the particulate size, the greater the effective surface area to volume of the phosphate particulates for contacting with the sulfuric acid in the process. Various grinding and screening systems are suitable for converting phosphate rocks into phosphate particulates having the desired size. Grinding may be achieved by hammer mills, ring roller mills, and ball mills. Screening may be achieved by vibrating screens or other suitable screening devices.

The phosphate solids, preferably in the form of small phosphate particulates, are then contacted with sulfuric acid to the presence of water to form a reaction mass resulting in the production of (formation of) phosphoric acid and a calcium sulfate, as is known in the art. The calcium sulfate typically takes the form of phosphogypsum. The calcium sulfate is then removed from the reaction mass to yield a phosphoric acid product and a calcium sulfate byproduct. Typical calcium sulfate byproducts from this step contain amounts of water and phosphate, and are typically stock piled as an undesired waste product.

In the present process the calcium sulfate byproduct is then dried (dewatered) to produce a calcium sulfate/phosphate product having preferably having less than 1 percent by weight water, more preferably less than 0.5% water, and most preferably less than 0.1% by weight water based on the total weight of the solid byproduct. Drying the product is desirable as it reduces the risk of undesired complications in the extruder (such as explosion of the extruder) due to the presence of high levels of residual water and high temperatures which can cause steam to form inside the extruder.

The process further involves admixing, preferably by melt mixing, (a) the byproduct (calcium sulfate compound/phosphate byproduct (mixture)), (b) a thermoplastic resin and (c) a functionalized compound to produce a filled thermoplastic composition. Optionally, graphite and/or calcium sulfate whiskers may admixed into the composition to provide further reinforcement therein.

The filled thermoplastic resin composition may then be processed to form a thermoplastic article. Suitable articles include thermoplastic-composite lumber, panels, tiles, railroad crossties, utility poles, pilings, bulkheads, marine fender piles, artificial reefs and fish habitat structures.

The thermoplastic composition preferably comprises (a) a polyolefin resin present at a level of from 10 to 99 percent by weight based on the total weight of the composition, (b) a fertilizer wet process by-product (filler comprising calcium sulfate and trace amounts of phosphate) present at a level of from 1 to 90 percent by weight based on the total weight of the composition, and (c) a functionalized compound present at a level of from 0.5 to 10 percent by weight based on the total weight of the composition.

The polyolefin resins include polymers of monoolefins and diolefins, for example polypropylene, polyisobutylene, polybutene-1, polymethylpentene-1, polyisoprene or polybutadiene, as well as polymers of cycloolefins, for instance of cyclopentene or norbornene, polyethylene, for example high density polyethylene, low density polyethylene, ultra high density polyethylene, and low density polyethylene may be used. Mixtures of these polymers, for example mixtures of polypropylene with polyethylene and mixtures of different types of polyethylene, may also be used. Also useful are copolymers of monoolefins and diolefins with each other or with other vinyl monomers, such as, for example, ethylene/propylene, low density polyethylene and its mixtures with low density polyethylene, propylene/butene-1, ethylene/hexene, ethylene/ethylpentene, ethylene/heptene, ethylene/octene, propylene/isobutylene, ethylene/butane-1, propylene/butadiene, isobutylene/isoprene, ethylene/alkylacrylates, ethylene/alkyl methacrylates, ethylene/vinyl acetate or ethylene/acrylic acid copolymers and salts thereof and terpolymers of ethylene with propylene and a diene, such as hexadiene, dicyclopentadiene or ethylidene-norbornene, as well as mixtures of such copolymers and their mixtures with polymers mentioned above, or for example polypropylene/ethylene-propylene-copolymers, low density polyethylene/high density polyethylene, ethylene vinyl acetate. Also suitable are polyvinyl chlorides.

Most preferably the thermoplastic resins are recycled and/or virgin polyolefin resins. Of these, the preferred recycled/virgin thermoplastic resins are High Density Polyethylene (HDPE) together in various combinations with Low Density Polyethylene (LDPE). The quantity of used in combination with HDPE is governed by the degree of flexural modulus desired in the piece or profile manufactured.

Suitable functionalized compounds include epoxidized oils such as epoxidized esters of unsaturated fatty acid which may be made by reacting alcohols with unsaturated fatty acids to produce esters of unsaturated fatty acids, followed by epoxidizing the esters of unsaturated fatty acids. The epoxidizing may be accomplished by treating the ester of an unsaturated fatty acid with a peroxy organic acid, such as perony acetic acid. Suitable alcohols include mono-ols, diols, triols such as glycerols, and higher polyols. Suitable unsaturated fatty acids include mono and poly (di, tri, and higher) unsaturated fatty acids such as oleic acid, linoleic acid, linolenic acid, and arachidonic acid. Naturally occurring esters of unsaturated fatty acids, more particularly glycerides of unsaturated fatty acids, include vegetable oils (chiefly from seeds or nuts), including soybean oil, linseed oil, and cottonseed oil, or alternatively mineral oil. Generally unsaturated fatty acids have from 4 to 24 carbon atoms. The most preferred epoxidized esters of unsaturated fatty acid is epoxidized soybean oil. Soybean oil is predominantly triglycerides of oleic acid, triglycerides of linoleic acid and triglycerides of linolenic acid. Additionally, metal chelates may be present such as titanium chelates to enhance the properties of the filled composition. Examples of titanium chelates are those represented by the general formulas (HOYO)2Ti(OR)2 or (H2NYO)2Ti(OR)2 wherein Y and R are selected from hydrocarbon groups, preferably C1 to C20 alkyl groups, and more preferably C2 to C8 alkyl groups and titanium chelates include, but are not limited to octylene glycol titanate and triethanolamine titanate, and most preferably is octylene glycol titanate. Titanium chelates are commercially available, for example a titanium chelate is available from KENRICH Petrochemicals, Inc. A suitable titanium chelate is isopropyl triisostearoyl titanate CH3 (CH3)(CHOTi(OC(O)C17H35)3. A preferred Titanate coupling agent is LICA 38 also available from KENRICH Petrochemicals, Inc. The titanium chelate coupling agents are preferably present at a level of from 1 to 1000 parts per million (ppm) based on the total weight of the composite, more preferably from 2 to 100. Amounts of mineral oil may also be present, and most preferably 2 ppm.

The plastic compositions may optionally contain flame retardants such as halogenated materials, preferably chlorinated or brominated compounds. The filler of the present invention is of a nature containing phosphates which provides the potential additional advantage of added flame retardency in the composition. Suitable flame proofing additives include low molecular weight bromine compounds, and examples include octabromodiphenyl ethers, tetrabromophthalimide, tribromophenoxymehtane, bis(tribromophenoxy)ethane, poly or oligomeric tetrabromobisphenol A, tris(tribromophenyl)triphosphate, trichlorotetrabromotoluene, hexabromocyclododecane and decabromodiphenyl ether.

The process of the present invention allows for the production fertilizer without the undesired stock piling (or solid waste disposal) of solid byproducts. The present process allows the combined production of fertilizer and useful building materials and railroad ties. The presence of the phosphate in the byproduct also provides for possible enhancement in the flame retardency of the product without the additional expense of purchasing a phosphate flame retardant.

Various other additives such as pigments, dyes, and oxidants, antioxidants, ultraviolet light stabilizers, etc. may be present in the composition or the composition may be free from such additional additives.

The thermoplastic compositions may further comprise neutralizers, primary antioxidants, secondary antioxidants and light stabilizers such as hindered amine light stabilizers.

The polyolefin resin is preferably present at a level of from 10 to 99 percent by weight based on the total weight of the composition, more preferably from 25 to 80 percent by weight thereof, and most preferably from 40 to 75 percent by weight thereof. The filler (fertilizer waste byproduct or tailing byproduct) is preferably present at a level of from 1 to 90 percent by weight based on the total weight of the composition, more preferably from 20 to 75 percent by weight thereof, and most preferably from 25 to 60 percent by weight thereof. The functionalized compound (epoxidized oil) is preferably present in the composition at a level of from 0.5 to 2 percent by weight based on the total weight of the composition, more preferably from 1 to 5 percent by weight thereof, and most preferably from 2 to 4 percent by weight thereof. The fertilizer waste byproduct known as phosphogypsum used in the present composition with a recycled high density polyethylene provides a filled thermoplastic composition primarily made up of recycled waste products (co-mingled post consumer polyolefins), industrial mineral waste byproduct such as phosphogypsum/fluorogypsum Flue Gas Desulfturization (FGD) Gypsum exhibiting suitable physical characteristics for articles such thermoplastic-composite lumber, panels, tiles, railroad crossties, utility poles, pilings, bulkheads, marine fender piles, artificial reefs and fish habitat structures. The composition may further contain carbon and/or graphite and/or calcium sulfate whiskers as reinforcing agents, at levels of from 1 to 20 percent by weight based on the total weight of the composition, more preferably from 2 to 15 percent by weight thereof, and most preferably from 5 to 15 percent by weight thereof. The use of Phosphogypsum/Fluorogypsum/Flue Gas Desulfurization (FDG) gypsum waste byproduct and recycled polyolefins allow the utilization of waste products, while producing products exhibiting useful physical properties. Thus, the waste by-products, phosphogypsum/fluorogypsum/flue gas desulfurization gypsum and waste (post-consumer) co-mingled recycled thermoplastics (polyolefins) can be utilized together to produce useful building and marine structural articles. In other words, the present invention provides a solution to waste products from the above processes, while producing building and marine structural articles.

The compositions may be used to make thermoplastic-composite lumber, car stops, roofing tiles, paneling, sheets, pipes, and other types of tiles and load bearing articles such as railroad crossties, marine piling systems (e.g., Glow-Pile™), utility poles and cross-arms, bulkheads and retaining walls. For example, thermoplastic-composite lumber can have a length of for example of between 4 feet and 12 feet (1.22 m and 3.66 m), for example between 6 feet and 10 feet (1.83 m and 3.05 m), for example about 8 feet (2.44 m) in length, and a rectangular cross-section transverse to the above length of for example between 1 inch and 12 inches (2.54 cm and 30.5 cm), for example between 1.5 inches and 8 inches (3.81 cm and 20.3 cm), for example between 3 inches and 6 inches (7.62 cm and 15.2 cm), and a depth of between 0.75 inches and 4 inches (1.91 cm and 10.2 cm), for example between 1 inch and 3 inches (2.54 cm and 7.62 cm), for example between 1.5 inches and 2.5 inches (3.81 cm and 6.35 cm), to replicate the dimensions of conventional wood lumber (2" by 4" (5.08 cm by 10.2 cm), 2" by 6" (5.08 cm by 4" (2.54 cm by 10.2 cm), and other cross-sectional dimensions).

As shown in FIG. 1, the process of the present invention involves a process for manufacturing fertilizer which utilizes the byproduct thereof, and more specifically involves (a) fertilizer manufacturing system (10) wherein phosphate rock (12) (phosphate rock stream (12)) is fed to a size reducing device (14) (grinder (14)) for reducing the phosphate rock into small size particulates which are then fed as intermediate stream (16) to a first screening unit (18) for separating intermediate phosphate stream (16) into (i) a large particle return stream (20) which is returned to the grinder (14) for further size reduction and (ii) a stream (22) of small particulates. The small particulates are then fed to a reaction vessel (24), and a water feed stream (26) and a sulfuric acid feed stream (28) are also fed to the reaction vessel to form a reaction mass (30). In the reaction mass (30) the phosphate rock and the sulfuric acid react to form liquid (aqueous) phosphoric acid and a solid calcium sulfate (phosphogypsum/fluorogypsum). The liquid phosphoric acid is removed from the vessel (24) as phosphoric acid stream (32) and is retained in a holding container (34) and is used as a fertilizer product, typically after being admixed with other conventional fertilizer elements. The solid calcium sulfate is removed from the vessel (24) as initial calcium sulfate stream (36) which contains undesirably high levels of water (typically in excess of 1 percent by weight based on the total weight of the initial calcium sulfate byproduct). The initial calcium sulfate stream (36) is then fed to a dewatering unit (38) wherein water is removed as water waste stream (40) and a dewatered calcium sulfate stream (42) exits the unit (38). The dewatering unit (38) may be in the form of a press or a heat drying unit or an air drying system, and preferably the dewatered calcium sulfate (42) has a water content of less than 1 percent by weight based on the total weight of the dewatered calcium sulfate. If the drying unit (38) undesirably causes particulate aggregation, then the system preferably further involves a calcium sulfate grinder (44) for reducing the particle size of the aggregated calcium sulfate to produce (i) a reduced particle size intermediate calcium sulfate stream (46) which is fed to a screening device (48) for separating the stream (46) into a small particulate (byproduct stream) (50) which is fed to an extruder (or other melt mixing device) (52) and (ii) a return calcium sulfate stream (54) of relatively larger size particles for return to the grinder (44) for size reduction. Alternatively to phosphogypsum, the filler may be fluorogypsum, Flue Gas Desulfurization (FGD) Gypsum, crude gypsum (calcium sulfate) or calcined gypsum.

Figure 2:
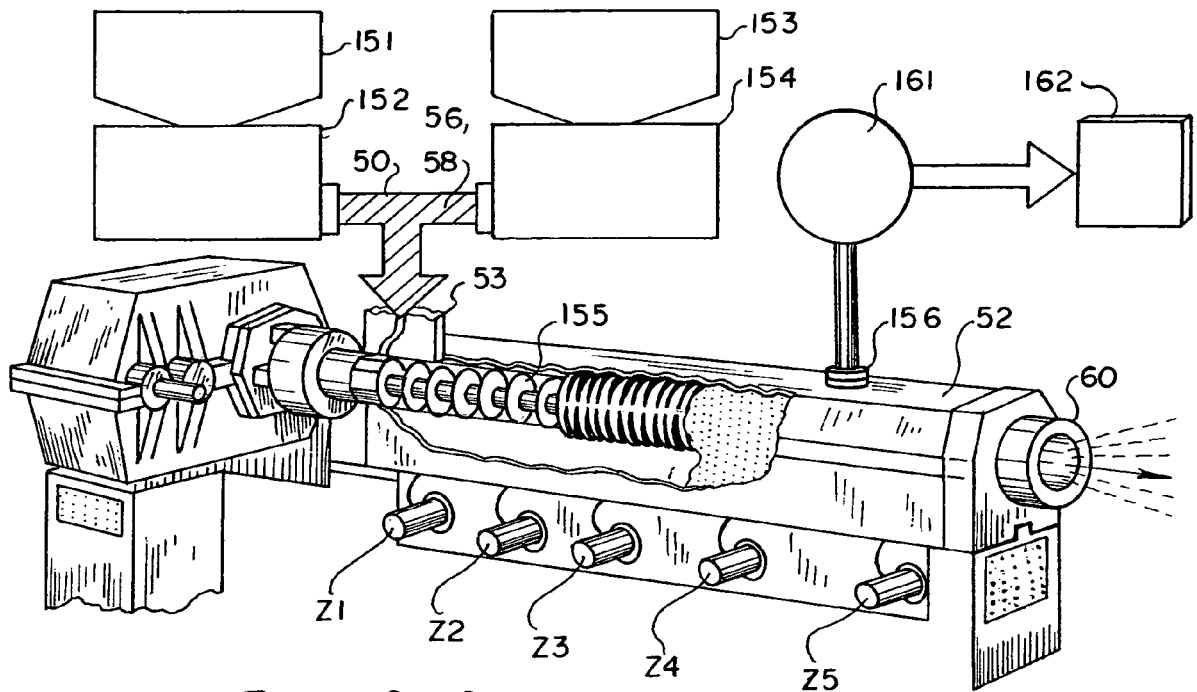
FIG. 2 is a perspective view of an extruder.

The extruder (52) (see also FIG. 2) may be a conventional melt extruder for filled thermoplastics and contains conventional heating and cooling controls for maintaining the extruder within a temperature range suitable for melt processing of the composition. The extruder (52) has an intake throat (53) for receiving the byproduct particulates (50), and for receiving respective amounts thermoplastic resin by resin stream (56) and functionalized compound (epoxidized oil) by functional compound stream (58). The extruder then melt mixes the particulates, resin and functionalized compound and forces the resulting resin composition through a die or into a mold (60) resulting in a shaped article (62) (final resin product/article stream (62)) or pellets depending upon the cross-sectional configuration of the die (60). The process may further involve an optional thermoforming unit (64) (such as an injection molding or a compression molding machine) wherein if the die (60) is configured to produce thermoplastic-composite sheet, the sheet may be thermoformed into desired shaped panels or tiles (66) or railroad ties.

The extruder (52) has an output of, for example, 1800 lbs./hr. (817.2 kg/hr.) For formula optimization, the extruder (52) could be, for example, a Berstoff Extruder: Laboratory Compound Twin 25 mm; Co-Rotating Intermeshing Screws; Vented; 24:1 Length/Diameter (L/D); Variable Speed High Torque Motor, Multiple Electric Heat Zones/Air Cooled. Laboratory tests were conducted using such an extruder. A commercial extruder (52) with similar features can have an output of, for example, 5,000-10,000 lbs./hr (2270-4540 kg/hr). Such extruders can be purchased from Berstoff, or Davis & Standard, Cincinnati Milocron, W&P.

Preferred process temperatures for the extruder (52) (see FIG. 2) are as follows: Heat Zone #1 (Z1)— range 140° C.-170° C.; Heat Zone #2 (Z2)—range 150° C.-180° C.; Heat (Z3)—Range 160° C.-190° C.; Heat Zone #4 (Z4) 170° C.-200° C.; Heat Zone #5 (Z5) 175° C.-205° C.; Head Flange Range (60)—180° C.-210° C.

The extruder line includes a dry waste storage hopper (151), a waste feeder (152), a polyolefin storage hopper (153), a polyolefin feeder (154), a screw (155), and a vent port (156). A vacuum pump (161) moves gas from the vent port (156) to a HEPA filter (162).

The calcium sulfate is present in the byproduct composition at a level of from 50 percent by weight to 99 percent by weight based on the total weight of the byproduct composition, more typically from 60 to 98 percent by weight thereof, and even more typically from 75 to 95 percent by weight thereof. The calcium sulfate may be in the form of calcium sulfate anhydrite or hemihydrate, in other words the calcium sulfate may be in the form of CaSO4, CaSO4.1/2H2O, CaSO4.2H2O or mixtures thereof. The byproduct composition may also contain trace dicalcium phosphate.

As shown in FIG. 4, the article (66) may be in the shape of a stick of lumber (68). As shown in FIG. 5, the article (66) may be in the shape of a sheet (70) (or panel (70)). As shown in FIG. 6, the article (66) may be in the shape of a roofing tile (72).

EXAMPLES

Formulation #1 was made by admixing: Phosphogypsum (a fertilizer process byproduct blend of calcium sulfate and phosphate) 23.5 pounds (10.7 kg), recycled high density polyethylene 16 pounds (7.26 kg), epoxidized soybean oil 225 grams and a titanium chelate @ 0.45 grams as coupling agent as manufactured by KENRICH Petrochemicals, Inc. The phosphogypsum and recycled high density polyethylene were dry mixed for 5 minutes. The epoxidized soybean oil and the chelate were blended for two minutes. The epoxidized soybean oil and chelate mixture was slowly added to the dry mixture of phosphogypsum and recycled polyethylene while it was mixing in the mixer. The time of mixing all ingredients together was 10 minutes (until compound was thoroughly mixed).

Formulation #2 was made by mixing: fluorogypsum @ 22.5 pounds (10.2), recycled high density polyethylene @ 16 pounds (7.26 kg), epoxidized soybean oil @ 225 grams, titanium chelate® 0.45 grams. The fluorogypsum and recycled high density polyethylene were dry mixed for 5 minutes. The epoxidized soybean oil and titanium chelate were slowly added to the dry mixture of fluorogypsum and recycled high density polyethylene while it was mixing in the mixer. The time of mixing all ingredients together was about 10 minutes (until the compound was thoroughly mixed). Both formulas 1 & 2 were then processed into small pellets and then processed through a small extrusion machine and a 2 inch by 2 inch by 12 inch long (5.08 cm by 5.08 cm by 30.5 cm long) sample was produced.

The presence of fluorine containing compounds in some fertilizer by products is well known and may be referred to as fluorogypsum. Fluorogypsum may also be generated by other processes such as a byproduct produced form the reaction of fluorspar with sulfuric acid in the production of hydrofluoric acid, see Azar Fluorogypsum Waste Solidification Material U.S. Pat. No. 4,935,211 issued Jun. 19, 1990 which is incorporated herein by reference. Fluorogypsum contains mostly calcium sulfate anhydrite and calcium sulfate having water chemically combined therewith, plus small quantities of fluorine containing compounds and possibly small concentrations of sulfuric acid. Disposal ponds for fluorogypsum occupy large areas of useful land and commonly require monitoring and maintenance by the owner. The disposal ponds are constantly increasing in size and quantity of fluorogypsum contained as the related production processes continue. Consequently, there is a problem with the continued accumulation of these byproducts and a need and desire to find a useful product which uses these materials. Fertilizer related processes producing fluorogypsum materials are known, see for example Sardisco et al Recovery of Fluorides From Gypsum U.S. Pat. No. 4,060,586 issued Nov. 29, 1977, Johnson U.S. Pat. No. 4,175,944 issued Nov. 27, 1979, Gaynor et al U.S. Pat. No. 4,402,922 issued Sep. 6, 1983 and Czysch et al Production of Low-Fluorine Gypsum as a By-Product in a Phosphoric Acid Process U.S. Pat. No. 4,026,990 issued May 31, 1977, all of which are incorporated herein by reference.

Instead of phosphogypsum or fluorogypsum as the filler, the filler could be tailings from a process for making metallic concentrate from metallic ore.

A process is provided for making metallic concentrate from metallic ore and for making plastic articles from the tailings therefrom. The process preferably involves (a) providing metallic ore, (b) grinding the ore to produce particles, (c) treating the particles with a floatation reagent to render the particulates air-avid and water repellant, (d) vigorously agitating and aerating the particles in the presence of water to produce a layer of froth containing air-avid particles, (e) collecting the froth, (f) collecting the underflow, (g) removing the tailings from the underflow, (h) drying the tailings to produce a dry particulate material comprising amounts of calcium carbonate, silica, fluorspar, barium sulfate, zinc and lead, (i) binding the particulates in a thermoplastic resin to produce a mineral filled composition, and (j) forming a thermoplastic article from the composition. The articles are preferably in the form of elongated blocks suitable as car stops, railroad ties or if utilized in combination as a seawall or sound barrier.

Floatation reagents are referred to as promoters or collectors, and effectively provide the mineral particulates with a coating that either repels or attracts water (water-repellent air-avid coating) and attaches (or adheres) to an air bubble. Suitable reagents for froth floatation of metallic sulfides are xanthates and dithiophosphates. Xanthates may be represented by the formula ROC(SNa)(=S) where R is an alkyl group preferably having from two to six carbon atoms. Dithiophosphates may be represented by the formula (RO)(RO)P(=S)(SNa) where R is an alkyl group preferably having from two to six carbon atoms. The reagent functions by being absorbed onto a metallic sulfide surface and bonding with sulfur atoms. The alkyl moiety effectively repels water thereby providing the particulates with a coating that is water repellent. Typical use ratios of reagents to ore are from 0.01 to 0.2 pounds (4.54 g to 91 g) of reagent per ton (908 kg) of ore processed.

The floatation process may utilize a plurality of flotation stages to provide increasing level of concentrate purities at each sequential stage, with the tailings from each intermediate stage being (optionally) recirculated back to an earlier stage in the process for additional Froth Flotation treatment. Tailing obtained from Froth Flotation of Galena rock typically yields undesirably high lead levels.

Froth floatation processes may also be utilized to process calcium fluoride to obtain fluorspar or fluorite, and the tailings therefrom can find utility in some of the articles of the present invention.

The microencapsulating preferably involves melt processing the thermoplastic composition, preferably a recycled polyolefin resin, to produce the filled thermoplastic article. The thermoplastic composition comprises (a) a thermoplastic resin, and (b) a filler comprising calcium carbonate, silica, fluorspar, barium sulfate, zinc and lead, and preferably (c) a functionalized compound. Articles formed from the compositions are useful in the manufacture of block structures, such as railroad ties, car stops, pilings, poles and timbers suitable for retaining walls and marine bulkheads. Other articles, such as roofing tiles, could also be made.

Conventional tailings from the production of Galen lead have tailing compositions comprising (a) calcium carbonate ($CaCO_3$) at a level of from 50 to 70 percent by weight based on the total weight of the composition, (b) silica ($SiO_2$) at a level of from 10 to 30 percent by weight based on the total weight of the composition, (c) fluorspar ($CaF_2$) at a level of from 1 to 5 percent by weight based on the total weight of the composition, (d) barium sulfate ($BaSO_4$) at a level of from 2 to 8 percent by weight based on the total weight of the composition, (e) zinc sulfide (ZnS) present at a level of from 0.05 to 0.3 percent by weight based on the total weight of the composition, and (f) lead sulfide (PbS) at a level of from 0.05 to 0.3 percent by weight based on the total weight of the composition.

The froth floatation process preferably involves (a) providing mineral ore and converting (reducing the size of) the mineral ore into particulates, preferably by grinding, and preferably involves converting mineral ore rocks having weight average diameter particle sizes of greater than 0.1 inches (0.254 cm) to small particulates having sizes of less than 0.05 inches (0.13 mm), more preferably less than 0.01 inches (0.254 mm), and most preferably less than 0.005 inches (0.013 mm), for example into a weight average diameter particulate sizes of no greater than 48 mesh (0.53 mm), more preferably no greater than 65 mesh (39 mm), and most preferably no greater than 80 mesh (0.32 mm). The smaller the particulate size, the greater the effective surface area to volume of the particulates for contacting with the reagent in the process. Various grinding and screening systems are suitable for converting mineral ore into particulates having the desired size. Grinding may be achieved by hammer mills, ring roller mills, and ball mills. Screening may be achieved by vibrating screens or other suitable screening devices.

The particulates are then contacted with a reagent in the presence of water to form a coated metallic sulfide suitable for separation by floatation. The metallic sulfide particulates are subjected to agitation and aeration in an aqueous medium to cause flotation of the metallic sulfide particulates and separation from the less valuable tailings. Tailings from this step contain amounts of water and lead, and have typically been stock piled as an undesired waste product.

In the present process the tailings (waste byproduct) are then dried (dewatered) to produce a mineral mass product having preferably having less than 1 percent by weight water, more preferably less than 0.5% water, and most preferably less than 0.1% by weight water based on the total weight of the solid byproduct. The byproduct also contains a residual amount of calcium carbonate, silica, fluorspar, barium sulfate, zinc, lead and other trace metals. Drying the product is preferable and reduces the risk of undesired complications in the extrusion process due to the presence of high levels of residual water and high temperatures in the presence of ingredients in the composition.

The process further involves admixing, preferably melt mixing, (a) the tailing composition (dried waste byproduct, for example calcium carbonate/silica/lead admixture), (b) a thermoplastic resin, for example high density polyethylene, and (c) a functionalized compound to produce a filled thermoplastic composition.

The filled thermoplastic resin composition may then be processed to form a thermoplastic article. Suitable articles include block shaped articles having a weight of at least 5 pounds and having a volume of at least one cubic foot. Suitable block shaped articles include car stops, railroad ties, pilings, poles and timbers suitable for retaining walls and marine bulkheads, and barrier walls such as sea walls and sound barrier walls.

The thermoplastic composition preferably comprises (a) a polyolefin resin (as described above) present at a level of from 10 to 99 percent by weight based on the total weight of the composition, (b) a Froth Flotation tailing byproduct (filler comprising calcium carbonate and lead) present at a level of from 1 to 90 percent by weight based on the total weight of the composition, and (c) a functionalized compound present at a level of from 0.5 to 10 percent by weight based on the total weight of the composition.

The process of the present invention allows for the production of valuable mineral concentrations without the undesired stock piling (or solid waste disposal) of solid tailing byproducts containing calcium carbonate, silica, fluorspar, barium sulfate, zinc and lead. The present process allows the combined production of valuable mineral concentrations and useful thermoplastic articles.

The mineral tailing waste byproduct comprising calcium carbonate, silica and lead when used in the present composition with a recycled high density polyethylene provides a filled thermoplastic composition primarily made up of recycled waste products exhibiting suitable physical characteristics for articles such as car stops, railroad ties, pilings, poles and timbers suitable for retaining walls and marine bulkheads, barrier walls and other useful block shaped profiles, even at high loading levels of the waste byproduct in the composition. Thus in a mineral mining setting, the waste product of the Froth Flotation process can be utilized to produce useful block shaped profiles or articles. In other words, the present invention provides a solution to waste products produced by the Froth Flotation mineral extraction process.

Figure 3:
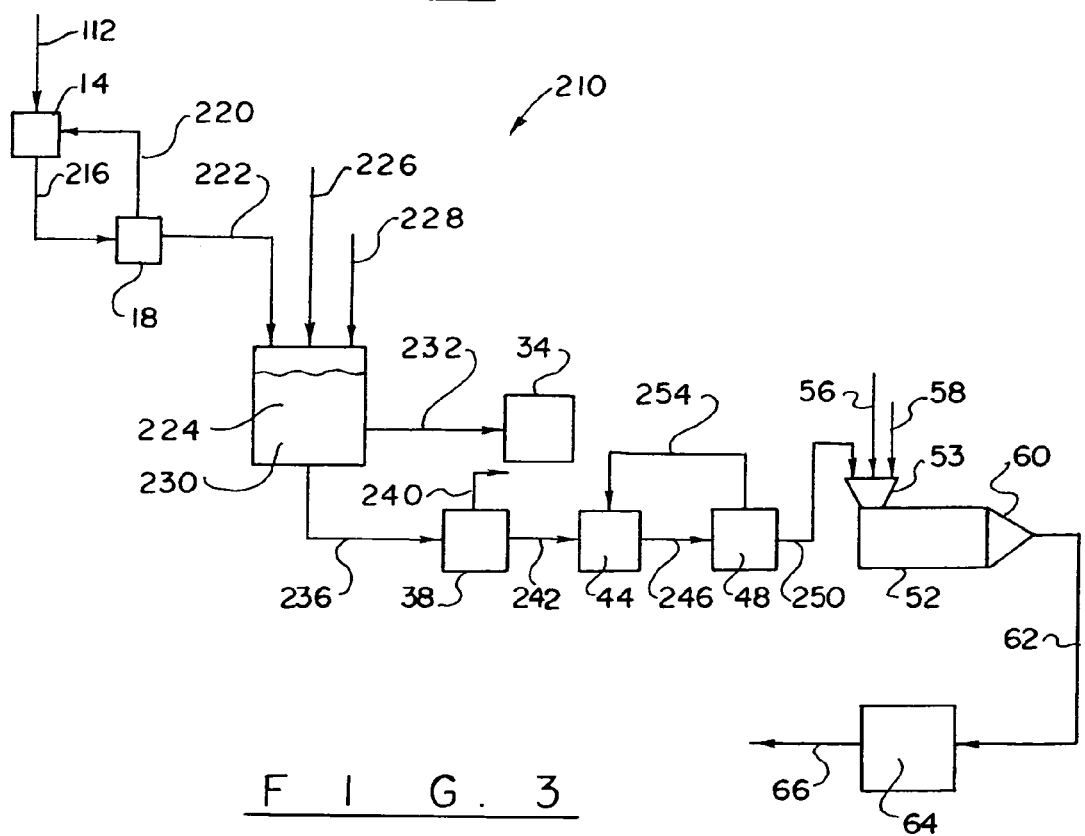
FIG. 3 is a schematic of a Froth Flotation process for making metallic concentrates and plastic articles from the tailings therefrom.

As shown in FIG. 3, the process of the present invention involves a process for manufacturing mineral concentrations which utilizes the tailing byproduct thereof, and more specifically involves (a) Froth Flotation system (210) wherein metallic mineral ore (112) (lead ore stream (212)) is fed to a size reducing device (14) (grinder (14)) for reducing the ore into small size particulates which are then fed as intermediate stream (216) to a first screening unit (18) for separating intermediate lead stream (216) into (i) a large particle return stream (220) which is returned to the grinder (14) for further size reduction and (ii) a stream (222) of small particulates. The small particulates are then fed to a Froth Flotation vessel (224), and a water feed stream (226) and a reagent feed stream (228) are also fed to the vessel to form an active mass (230). In the active mass (230) the ore and the reagent interact to form a water repellant and air-avid coating on metallic sulfide particles. The aqueous mass is then agitated and aerated resulting in the coated particles attaching to air bubbles and concentration in the resulting froth. The remaining waste particles sink and accumulate in the underflow. The froth concentrate is removed from the vessel (224) as froth concentrate stream (232) and is retained in a holding container (34) and is used as a concentrated source of metal (for example lead). The underflow is removed from the vessel (224) as underflow stream (236), and is separated into a waste water stream and a tailing stream. The tailing stream contains undesirably high levels of water (typically in excess of 1 percent by weight based on the total weight of the tailing stream). The tailing stream (236) is then fed to a dewatering unit (38) wherein water is removed as a water waste stream (240) and a dewatered tailing stream (242) which exits the unit (38). The dewatering unit (38) may be in the form of a press or a heat drying unit or an air drying system, and preferably the dewatered tailing (242) has a water content of less than 1 percent by weight based on the total weight of the dewatered tailing. If the drying unit (38) undesirably causes particulate aggregation, then the system preferably further involves a grinder (44) for reducing the particle size of the aggregated tailing to produce (i) a reduced particle size intermediate tailing stream (246) which is fed to a screening device (48) for separating the stream (246) into a small particulate (byproduct stream) (250) which is fed to an extruder (or other melt mixing device) (52) and (ii) a return tailing stream (254) of relatively larger size particles for return to the grinder (44) for size reduction.

The tailing byproduct typically comprises (a) a calcium carbonate, (b) silica and (c) lead sulfide. The calcium carbonate is typically present in the byproduct composition at a level of from 20 percent by weight to 90 percent by weight based on the total weight of the byproduct composition, more typically from 40 to 80 percent by weight thereof, and even more typically from 50 to 70 percent by weight thereof. The silica is present in the byproduct composition at a level of from 1 to 50 percent by weight based on the total weight of the byproduct composition, more typically from 5 to 40 percent by weight thereof, and even more typically from 10 to 30 percent by weight thereof.

Figure 20:
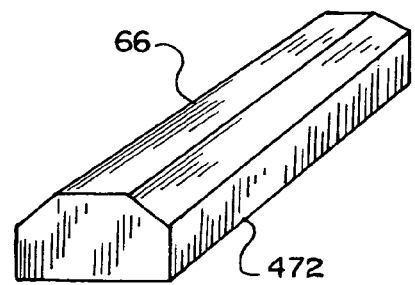
FIG. 20 is a perspective view of an article of the present invention in the shape of a car stop.
Figure 21:
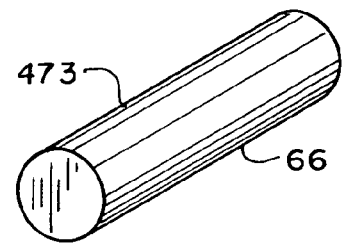
FIG. 21 is a perspective view of an article of the present invention in the shape of a round post.
Figure 22:
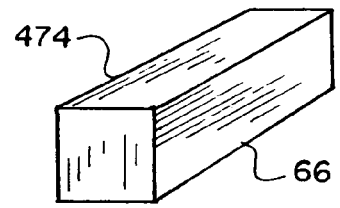
FIG. 22 is a perspective view of an article of the present invention in the shape of a square post.
Figure 23:
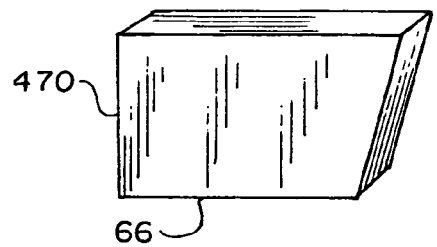
FIG. 23 is a perspective view of an article of the present invention in the shape of a barrier wall, such as a sea wall or a sound barrier wall.

As shown in FIG. 7, the article (66) may be in the shape of a railroad tie (168). As shown in FIG. 23, the article (66) may be in the shape of a barrier wall (sea wall (470)) (or sound barrier wall (470)). As shown in FIG. 20, the article (66) may be in the shape of a railroad crosstie or car stop (472). FIG. 21 is a perspective view of an article of the present invention in the shape of a round post 473. FIG. 22 is a perspective view of an article of the present invention in the shape of a square post 474.

Another embodiment of the present invention involves composite thermoplastic railroad ties and processes for making railroad ties. The thermoplastic railroad ties comprise (a) a thermoplastic resin (b) a filler comprising phosphogypsum and/or fluorogypsum and/or flue gas desulfurization gypsum and/or crude gypsum and/or calcined gypsum (all various sources of calcium sulfate) and (c) a functionalized compound (for lubrication, such as oil or processing wax). The ties exhibit certain desired and enhanced properties over conventional wooden ties and over sand filled ties. The filler may be obtained by the fertilizer manufacturing process described above. Other fillers such as fluorogypsum, calcium fluoride, calcium difluoride, fluorspar, barites, barytes, and barium sulfate (BaSO4) may be used as a portion of the inorganic material.

The process further involves admixing, preferably melt mixing, (a) the byproduct comprising, for example, calcium sulfate, (b) a thermoplastic resin and (c) a functionalized compound to produce a filled thermoplastic composition. Optionally, fiber reinforcing agents may admixed into the composition. These agents may be virgin gypsum fibers or whiskers. The filled thermoplastic resin composition may then be processed to form a thermoplastic filled composite railroad ties. The ties may be then used to support rail in the making of railroad tracks.

The thermoplastic composition preferably comprises (a) a polyolefin resin present at a level of from 10 to 99 percent by weight based on the total weight of the composition, (b) a fertilizer wet process byproduct (filler comprising calcium sulfate and phosphate, and optionally other fillers may be utilized comprising calcium fluoride, fluorspar, calcium difluoride or fluorogypsum or tailings from the Froth Flotation process) present at a level of from 1 to 90 percent by weight based on the total weight of the composition, and (c) a functionalized compound present at a level of from 0.5 to 10 percent by weight based on the total weight of the composition. If titanate is used, it is preferably used at levels of from 100 ppm to 2000 ppm based on the total weight of the composition. The fertilizer waste byproduct comprising calcium sulfate and phosphate when used in the present composition provides a filled thermoplastic composition exhibiting suitable physical characteristics for railroad ties, even at high loading levels of the waste byproduct in the composition. When used for railroad ties, the composition may further contain reinforcing fiber, such as carbon and/or graphite and/or calcium sulfate whiskers at levels of perhaps from 1 to 20 percent by weight based on the total weight of the composition, determined by the desired physical properties of the product.

Suitable railroad ties may for example have lengths of from 6 feet to 20 feet (1.83 m to 6.10 m) and widths of from 8 inches to 12 inches (20.3 cm to 30.5 cm) and heights of from 5 inches to 10 inches (12.7 cm to 25.4 cm). The railroad ties (168) (see FIG. 7) preferably have two spaced apart rectangular vertical sides (106, 108), a horizontal rectangular top (110) and a horizontal rectangular bottom (112) spaced apart from the top (110), and a pair of vertical rectangular ends (114, 116) extending between the sides (106, 108) and the top (110) and bottom (112). The weight of the railroad tie may range from 100 pounds to 500 pounds (45.4 kg to 227 kg) depending on the level of filler in the compound.

As shown in FIG. 7, the railroad tie (168) may generally be similar in exterior shape to the shape of a conventional railroad tie. The tie (168) may have various additional features not present in conventional ties, specifically the tie may have holes (100) (two sets of four spaced for receiving lag (carriage) bolts (timber screws) (78)) extending vertically therethrough. Each set of four holes has two pair spaced apart for being positioned on opposite sides of the rail (76) and adjacent thereto. FIG. 8 is a perspective view of a railway (72) which comprises the present ties (168) and rails (76) and rail bolts (78) or other suitable fastening devices for holding the rails (76) in position relative to the ties (168) and relative to the road bed (104) on which the ties (168) are supported. As shown in FIGS. 8 and 10 the ties are supported on a railbed (104) and are partially embedded therein for reducing movement of the ties (168). FIG. 9 is a vertical cross-sectional view of the railroad tie and shows the optional holes (100) for receiving the bolts (78) for holding the rail in position relative to the ties (168). FIG. 10 is a vertical cross-sectional view of the railway (72). Prior railways are disclosed in Tamas et al U.S. Pat. No. 5,163,614 issued Nov. 17, 1992 and Braitsch, et al U.S. Pat. No. 4,500,037 issued Feb. 19, 1985, both of which are incorporated herein by reference. The compositions of the present invention exhibit desired properties for railroad ties, including tests such as bolt pull tests and compression tests and three-point bend tests (properties). It appears that the crystalline nature of the crystalline filler of the present invention provides enhanced properties in the railroad tie formulations compared to the properties that would be attained by using a filler such as sand. The compositions of the present invention appear to provide a compressional strength in excess of the compression strength of oak, for example a factor of about 10 times the compressional strength of oak as measured by ASTM test, and the retentional strength of the composite is desirable as is required for holding leg-bolts to rails of railroad tracks. The use of the waste byproduct also provides the advantage of finding a desirable use for the byproduct. The present material is also relatively resistant to attack from organisms and does not require the use of preservatives such as creosote.

FIGS. 11 and 12 show a first alternative embodiment of a railroad cross tie 468 having an optional longitudinally extending cooling hole 469 through the center thereof, extending from one end to the other. FIGS. 13 and 14 show a second alternative embodiment of a railroad cross tie, tie 478. These embodiments are advantageous because they spread the weight of the track out over a greater area (exemplary dimensions are 10" (25.4 cm) wide for the base, 8" (20.3 cm) for the top width, and 6" (15.2 cm) for the height. The length of the cross ties can be traditional lengths. The tie 468 is preferred because the lower corners 490 of tie 478 have a tendency to chip because they are so thin—in tie 468 the lower corners are truncated.

Conventional railroad crossings have historically been the scene of numerous undesired collisions between trains and automobiles. Consequently, there is a desire to enhance train engineer and automobile driver awareness of the existence of each crossing location. The present invention further involves the use of a yellow colorant (dye or pigment, conventional yellow dyes and pigments for thermoplastics may be used) in the thermoplastic compositions for making of the tie and for use in the process during admixing to provide a yellow colored tie for use at the intersection and before (within 0.5 miles) of the intersection where a road (highway) crosses a railroad track. The bright yellow ties at the intersection provide motorists with additional visual stimuli for the purpose of enhancing awareness of the existence of the crossing, and the yellow ties located at positions before (within 0.5 miles (0.81 km) of the intersection) provide the engineer with addition warning of the existence of the intersection.

Suitable compositions for use in the manufacture on railroad ties were made and included admixing 10.5 pounds (4.77 kg) of phosphogypsum, 4.5 pounds (2.04 kg) of high density polyethylene (RHDPE), 52.08 grams of epoxidized soya oil and 18.75 grams of titanate.

From exposure evaluations (LSU Nuclear Science Department on behalf of the inventors) resulting from the manufacturing and use of phosphogypsum/plastic composite railroad ties, the MREM/YR for radon was less than 0.1 for railroad construction group, homes 50 feet (15 m) from railroad, near stored ties 1 meter away and near stored ties 10 meters away, and nil for the groups of extruder operator, worker near starting material hopper, and railroad passenger because the resin effectively encapsulates the waste byproduct reducing the potential exposure to radon gases from the byproduct.

Railroad ties can be produced by using a single screw extruder, a twin screw compounding extruder, a bath mix extruder, or a continuous mixer extruder such as a Kobelco Stewart Bolling "Nex-T" series extruder.

Railroad ties can be made by injection molding or continuous extrusion.

When coupling agents are employed in the process of the present invention for producing railroad cross-ties, the most commonly used are generically called titanate, zirconate, and aluminate coupling agents. Some of the most widely used of these are neoalkoxy titanate sold under the trademark LICA, monoalkyloxy titanate sold under the trademark Ken-React, KR®TTS (isopropyl, triisostearyol titanate), tri-dodecyl-benzene-sulfonyl titanate, neopentyl (diallyl) oxy, tri (dioctyl) phosphate titanate sold under the trademark LICA 12®; all of these are commercially available from Kenrich Petrochemicals, Inc. of Bayonne, N.J.

The present invention also comprises composite thermoplastic pilings (protective articles) and processes for making them. The thermoplastic pilings comprise (a) a core element comprising (i) a thermoplastic resin and (ii) a filler, and (b) an outer layer (sheath) comprising (i) a transparent (or translucent or clear) thermoplastic resin and a light responsive material, preferably a photoluminescent material. The composite (and protective article) is dense and preferably has a density of greater than 1.0 g/cm$^3$, and most preferably 1.4-1.7 g/cm$^3$, though the density can be greater than 2.0 g/cm$^3$.

The filler is preferably phosphogypsum (or fluorogypsum) and may be obtained as a byproduct from the fertilizer manufacturing process mentioned above. A thermoplastic filled composition suitable as the core is made by admixing the calcium sulfate byproduct with a thermoplastic resin and a functionalized compound. The protective article (and/or core element) may then be manufactured by melt processing (for example injection molding or compression molding or coextrusion) the thermoplastic composition.

The process further involves admixing, by melt mixing, (a) the filler (e.g., waste byproduct such as phosphogypsum or fluorogypsum, FGD gypsum, crude gypsum, calcined gypsum), (b) a thermoplastic resin such as polyethylene and preferably (c) a functionalized compound to produce a filled thermoplastic composition suitable as the core element for the piling.

Optionally, carbon and/or graphite and/or calcium sulfate whiskers as reinforcing agents may admixed into the composition. The filled thermoplastic resin composition may then be processed to form thermoplastic filled composite marine pilings and marine safety (Glow-Pile™) fender-pile system. The pilings may be then used to protect structures and may be used alone or in combination with conventional wood pilings.

Suitable pilings may for example have lengths of from 20 feet to 100 feet (6.10 m to 30.5 m), more preferably from 30 feet to 50 feet (9.14 m to 15.2 m), and most preferably about 40 feet (12.2 m), and diameters (widths) of from 8 inches to 20 inches (20.3 cm to 51 cm)), more preferably from 10 inches to 14 inches (25.4 cm to 35.6 cm) and most preferably about 12 inches (30.5 cm). The pilings have a density preferably greater than 1.0 g/cc due to the amount and density of the filler material, and preferably the pilings have a density in excess of 2.0 g/cc, and sometimes as high as 2.5 g/cc (and typically 1.44 g/cc), depending upon the fillers used and the loadings thereof. The weight of the piling preferably ranges from 750 pounds to 4,000 pounds (341 kg to 1816 kg) depending on the level of filler in the composition and size of the piling, and more preferably ranges from 750 pounds to 2,000 pounds (341 kg to 908 kg). The pilings may be cylindrical (preferably) or slightly tapered having a wider diameter bottom than top. Groups of pilings may be banded or bolted together to form a unit. The pilings preferably have the other layer (sheath, collar) on only the top end (one end) of the piling, for example having only the top half or the top third or top quarter having the outer layer and the bottom half or bottom two thirds or bottom three quarters not having an outer photoluminescent layer or sheath. The top portion of the piling is usually the only portion that is primarily out of the water level during use. For example, the bottom portion of the piling may be positioned below the mud level during use, with the top quarter of the piling above the water level (upper surface of the water) and the remaining portion of the piling being between the mud level and the water level. Consequently, the light responsive layer is only needed where it is visible to the ship personnel.

As shown in FIG. 1, the process for making the piling of the present invention preferably involves a first step involving a process for making the filler. The filler may be obtained by the process for manufacturing fertilizer described above wherein the byproduct is utilized as the filler for the piling core composite. The process further involves a melt processing unit (64) (extruder) such as a coextruder providing an outer coating layer (sheath, sleeve, collar) about the inner core. The sheath may alternatively be made by injection molding, and the sheath may then be placed on the core element by slipping it over the top of the core element.

The piling (300) may generally be either square, oval or cylindrical. The piling (300) has an outer layer (306) which may also be referred to as a sheath (or coating) (306) which covers a top portion (308) of the piling (300) and is preferably affixed (adhered) to a core element (310) of the piling (300).

FIG. 16 is a perspective view of an alternative embodiment of the composite piling of the present invention, piling 400. Piling 400 includes a sheath 406 which may originally be flat and is wrapped around the core element 310 and is riveted thereto with rivets 407.

Figure 17:
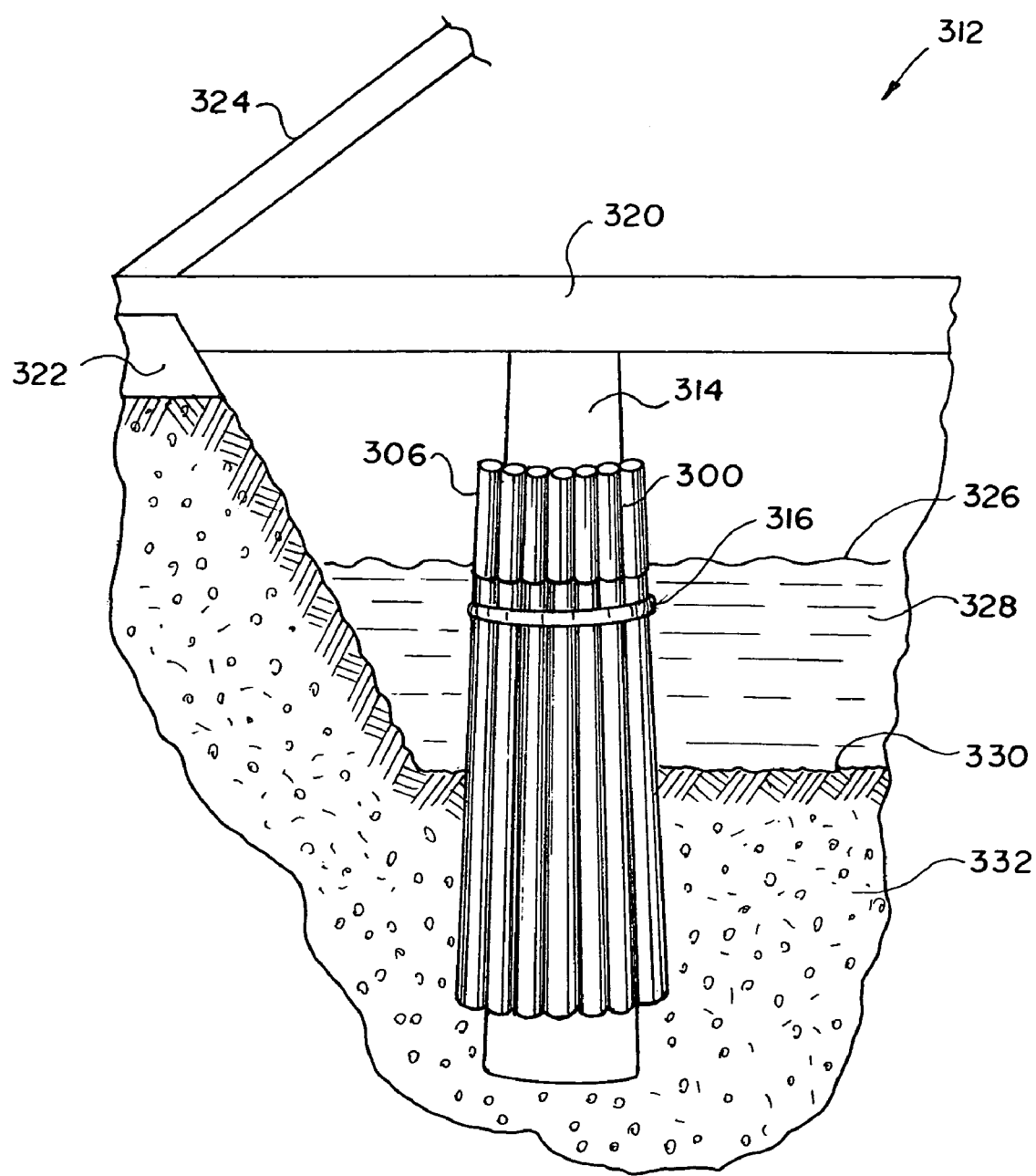
FIG. 17 is a perspective cutaway view of a bridge structure having pilings according to the present invention.
Figure 18:
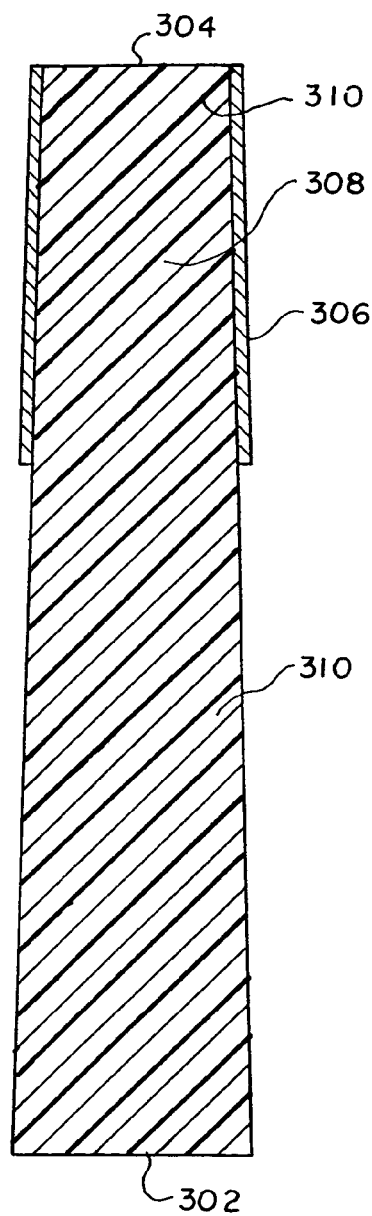
FIG. 18 is a vertical cross-sectional view of the piling of FIG. 15.

FIG. 17 is a cutaway perspective view of a bridge structure (312) which comprises the present pilings (300). The pilings (300) are in protective position around support columns (314) of the bridge (312) to protect the columns from ship or barge contact. The pilings (300) are preferably banded (or bolted by bolts, forming clusters) together by a band (316) to secure the pilings about the support column (314). The support column supports the weight of the bridge travel surface (bed) (320). The bridge (312) is preferably supported at its ends by abutments (322) and is also supported by upper structural members (324). The support column (314) extends downwardly from bridge travel road bed (320) down to the water surface (326), through the body of water (328), down through the mud surface (river bed) (330), and deep into the mud (332) to provide a stable foundation for the bridge (312). The pilings (300) extend from above the water surface (326) through the body of water (328) and into the mud (332) and may provide the structure with support as well as with protection from ships (barges). The pilings (300) have an outer layer (306) which covers (surrounds) the upper portion (308) of the piling (300). The sheath 306 may optionally be placed on the core (310) by slipping the sheath over the top end of the piling. The sheath may be slightly tapered to match the taper of the upper portion of the piling as best shown in FIG. 15.

Figure 19:
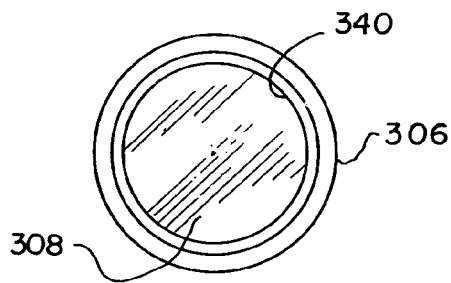
FIG. 19 is a horizontal cross-sectional view of a sheath of a piling according to the present invention.

The sheath (306) comprises a composition of a translucent (but preferable transparent or clear) thermoplastic resin and a light absorbing/emitting (light-responsive) material. The thermoplastic resin may suitably be a transparent polyolefin or may be a polycarbonate resin or a polyvinylchloride resin. The light absorbing/emitting (luminescent) material is preferably a photoluminescent material, such as the photoluminescent materials disclosed in Lindmayer U.S. Pat. No. 4,812,660 issued Mar. 14, 1989 and Lucky U.S. Pat. No. 3,668,142 issued Jun. 6, 1972, all of which are incorporated herein by reference. As shown in FIG. 19, the inner surface of the sheath may have a thin photoluminescent inner coating (340). Coextrusion may be utilized to form the core and the outer layer. The outer layer is formed (extruded) only about a portion (top portion, first portion) of the core so that when the piling is in use, the portion that is above the water level will be coated while the portion below the water level will be un-coated (not coated) to minimize the expense of the coating material.

Conventional pilings have historically been the scene of numerous undesired collisions between ships (barges) and waterway structures (bridges). Consequently, there is a desire to enhance ship operator (captain) awareness of the existence of each such structure and piling. The marine safety fender pile preferably with its photoluminescent coating or sheath provides the ship operator with a visible warning after darkness falls (in the evening hours). Sunlight (solar energy) is stored by the photoluminescent material during daylight hours and then automatically discharges during darkness (some photoluminescent material can discharge light for up to 10 hours without recharging). Also, preferably the photoluminescent material is one which charges with ultraviolet light (such as sunlight), fluorescent light, or incandescent light so that the piling is charged during the day and at night as well when it is irradiated by the light from ships or from other nearby light sources. Such a photoluminescent material is zinc sulfide crystals (ZnS). Other excellent photoluminescent material which may be utilized are Strontium Aluminate (SrAl) and Strontium Sulphide (SrS) which very likely is currently the most compatible with the calcium sulfate fillers used in the present invention.

Another suitable filler is fluorogypsum. Fluorogypsum may also be obtained by various processes such as a byproduct produced from the reaction of fluorspar with sulfuric acid in the production of hydrofluoric acid, see Azar Fluorogypsum Waste Solidification Material U.S. Pat. No. 4,935, 211 issued Jun. 19, 1990 which is incorporated herein by reference. Fluorogypsum contains mostly calcium sulfate anhydrite and calcium sulfate having water chemically combined therewith, plus small quantities of fluorine containing compounds and possibly small concentrations of sulfuric acid. Disposal ponds for fluorogypsum occupy large areas of useful land and commonly require monitoring and maintenance by the owner. The disposal ponds are constantly increasing in size and quantity of fluorogypsum contained as the related production processes continue. Consequently, there is a problem with the continued accumulation of these byproducts and a need and desire to find a useful product which uses these materials. Processes producing fluorogypsum materials are known, see for example Sardisco et al Recovery of Fluorides From Gypsum U.S. Pat. No. 4,060, 586 issued Nov. 29, 1977, Johnson U.S. Pat. No. 4,175,944 issued Nov. 27, 1979, Gaynor et al U.S. Pat. No. 4,402,922 issued Sep. 6, 1983 and Czysch et al Production of Low-Fluorine Gypsum as a By-Product in a Phosphoric Acid Process U.S. Pat. No. 4,026,990 issued May 31, 1977, all of which are incorporated herein by reference.

The sheath covers at least a portion of the core element. The sheath comprises (i) a thermoplastic resin and (ii) a photoluminescent material. The thermoplastic resin is preferably present in the sheath at a level of from 60 to 99 percent by weight based on the total weight of the sheath, more preferably from 70 to 98 percent by weight thereof, and most preferably from 75 to 95 percent by weight thereof. A suitable thermoplastic resin is polyethylene, polypropylene and other resins that are either translucent or transparent, for example various polyolefins are suitable. The photoluminescent material is preferably present in the sheath at a level of from 1 to 30 percent by weight based on the total weight of the sheath, more preferably from 2 to 20 percent by weight thereof, and most preferably from 3 to 10 percent by weight thereof. The photoluminescent material is preferably a phosphorescent metal sulphide such as zinc, calcium, cadmium or strontium sulphide as disclosed in Gravisse et al U.S. Pat. No. 4,211,813 issued Jul. 8, 1980 which is incorporated herein by reference. The most preferred photoluminescent material is zinc sulfide, which can be, for example, in the crystal form present in Johnsonite Permalight photoluminescent Safe-T-First products.

In addition to Formulations #1 and #2 for the core material, suitable compositions for use in the manufacture of pilings were made and included admixing 10.5 pounds (4.77 kg) of fluorogypsum, 4.5 pounds (2.04 kg) of high density polyethylene (HDPE), 52.08 grams of epoxidized soya oil and 18.75 grams of titanate.

The present inventors have conducted research using the following different formulations, wherein ESBO is epoxidized soybean oil. When ESBO is used, it can be in the range of 1.0 to 2.0% by weight and when titanate is used, it is preferably in the range of 0.025% to 0.10% by weight.

The preferred formulation depends upon the article being made and the physical properties sought for that article. For a crosstie, it might be Formula #5.

Formulas using only RHDPE (recycled high density polyethylene) with no oil or additive:

Formula #1
50% byproduct phosphogypsum and/or fluorogypsum and/or FGD gypsum; and/or crude gypsum and/or calcined gypsum
50% HDPE and/or RHDPE Formula #2
60% byproduct phosphogypsum, fluorogypsum, FGD gypsum, and/or crude and/or calcined gypsum
40% HDPE and or RHDPE Formula #3
70% byproduct phosphogypsum and/or fluorogypsum and/or FGD gypsum; and/or crude gypsum and/or calcined gypsum
30% HDPE and/or RHDPE Formulas using high and low density polyethylene, with no oil or additive:

Formula #4
50% byproduct phosphogypsum and/or fluorogypsum and/or FGD gypsum; and/or crude gypsum and/or calcined gypsum
40% HDPE and/or RHDPE
10% LDPE and/or RLDPE Formula #5
60% byproduct phosphogypsum and/or fluorogypsum and/or FGD gypsum; and/or crude gypsum and/or calcined gypsum
30% HDPE and/or RHDPE
10% LDPE and/or RLDPE Formula #6
70% byproduct phosphogypsum and/or fluorogypsum and/or FGD gypsum; and/or crude gypsum and/or calcined gypsum
20% HDPE and/or RHDPE
10% LDPE and/or RLDPE Formulas using high density polyethylene and oil and additive:

Formula #7
48% byproduct phosphogypsum and/or fluorogypsum and/or FGD gypsum; and/or crude gypsum and/or calcined gypsum
50% HDPE and/or RHDPE
1.5% ESBO
0.05% Titanate Formula #8
58% byproduct phosphogypsum and/or fluorogypsum and/or FGD gypsum; and/or crude gypsum and/or calcined gypsum
40% HDPE and/or RHDPE
1.5% ESBO
0.05% Titanate Formula #9
68% byproduct phosphogypsum and/or fluorogypsum and/or FGD gypsum; and/or crude gypsum and/or calcined gypsum
30% HDPE and/or RHDPE
1.5% ESBO
0.5% Titanate Formulas using high and low density polyethylene and oil and additive:

Formula #10
48% byproduct phosphogypsum and/or fluorogypsum and/or FGD gypsum; and/or crude gypsum and/or calcined gypsum
40% HDPE and/or RHDPE
10% LDPE and/or RLDPE
1.5% ESBO
0.05% Titanate Formula #11
58% byproduct phosphogypsum and/or fluorogypsum and/or FGD gypsum; and/or crude gypsum and/or calcined gypsum
30% HDPE and/or RHDPE
10% LDPE and/or RLDPE
1.5% ESBO
0.05% Titanate Formula #12
68% byproduct phosphogypsum and/or fluorogypsum and/or FGD gypsum; and/or crude gypsum and/or calcined gypsum
20% HDPE and/or RHDPE
10% LDPE and/or RLDPE
1.5% ESBO
0.05% Titanate Formulas using high and low density polyethylene, polypropylene, and oil and additive:

Formula #13
48% byproduct phosphogypsum and/or fluorogypsum and/or FGD gypsum; and/or crude gypsum and/or calcined gypsum
40% HDPE and/or RHDPE
5% LDPE and/or RLDPE
5% Polypropylene
1.5% ESBO
0.05% Titanate Formula #14
58% byproduct phosphogypsum and/or fluorogypsum and/or FGD gypsum; and/or crude gypsum and/or calcined gypsum
30% HDPE and/or RHDPE
5% LDPE and/or RLDPE
5% Polypropylene
1.5% ESBO
0.05% Titanate Formula #15
68% byproduct phosphogypsum and/or fluorogypsum and/or FGD gypsum; and/or crude gypsum and/or calcined gypsum
20% HDPE and/or RHDPE
5% LDPE and/or RLDPE
5% Polypropylene
1.5% ESBO
0.05% Titanate Formula #16
80% byproduct phosphogypsum and/or fluorogypsum and/or FGD gypsum; and/or crude gypsum and/or calcined gypsum
20% HDPE and/or RHDPE Formula #17
78%
20% HDPE and/or RHDPE
1.5% ESBO
0.05% Titanate Formula #18
78% byproduct phosphogypsum and/or fluorogypsum and/or FGD gypsum; and/or crude gypsum and/or calcined gypsum
10% HDPE and/or RHDPE
5% LDPE and/or RLDPE
5% Polypropylene
1.5% ESBO
0.05% Titanate Formula #19
78% byproduct phosphogypsum and/or fluorogypsum and/or FGD gypsum; and/or crude gypsum and/or calcined gypsum 20% HDPE and/or RHDPE
10% LDPE and/or RLDPE
1.5% ESBO
0.05% Titanate.

In the formulas above, although recycled polyolefins are mentioned, virgin polyolefins could be used instead.

The present inventors have also used color pigments and flame retardants. When in production of a finished product the present inventors expect to use UV inhibitors, antioxidants, colors and possibly processing waxes.

Calcium sulfate whiskers are commercially available from U.S. Gypsum Corporation in both a hydrated and anhydrous form. The inventors do not know yet which form, hydrated or anhydrous, will be preferred as it depends on the optimum operating temperatures (OOT) of the extruders. If the OOT of the extruders turns out to be high enough to expel the "water of hydration" or the "bound water" it will create steam within the extruder. If the steam cannot be vented fast enough or the steam causes "off-gassing" of volatiles (such as volatile organic compounds), then it (steam) could become an "environmental problem". So, in that event, it might be advantageous to use the anhydrous form of calcium sulfate whiskers as this would obviate the steam problem. A preferred calcium sulfate filler is CAS-20™-4 brand white anhydrous calcium sulfate filler sold by U.S. Gypsum.

The tailings from the "Froth Flotation" mineral extraction process contains some very small traces of zinc sulfate (ZnS). Zinc sulfate is a mineral used to make some photoluminescent crystals. While there is not enough present to cause fluorescing and it is not in the proper crystalline form, ZnS is very compatible with the composites of the present invention.

Zinc oxide is another mineral used to make photoluminescent crystals.

The "Glow-Pile" technology can use commercially available photoluminescent material.

For some time, the present inventors have been looking for the right reinforcing fiber or whisker, as reinforcing fibers are sometimes known, in the event that they need to extend the mechanical properties of the thermoplastic composites of the present invention.

U.S. Pat. No. 5,183,594 describes a method of manufacturing zinc oxide whiskers having a novel crystalline form (tetrapod). It appears that the photo-luminescent tetrapod crystal of U.S. Pat. No. 5,183,594 not only fluoresces but could also serve to reinforce the structure of the composite material itself thus serving two desirable functions at once, if it were used in the luminous pilings of the present invention. It is possible that Zinc Sulfate and/or Zinc Oxide in certain crystalline forms, for example, a tetrapod, could both illuminate and reinforce the basic thermoplastic-mineral composites of the present invention.

Photoluminescent material can be used throughout the pilings of the present invention so that chipping of the pilings does not result in a loss of luminescence. Alternatively, photoluminescent material can be used simply in a sheath 406 which can be for example riveted with rivets 407 to an existing pile 310 (see FIG. 16). The sheath 406 could be cut from a roll of photoluminescent infused polymeric material such as a composite of the present invention or other compatible matrix.

The composite materials of the present invention can be formed into beach armor (large structures for protecting beaches by absorbing wave energy) or marine blocks. In such a case, one would preferably use more BaSo4 and PbS to make the armor or marine blocks more dense. The wave absorbing structures have a density of greater than 1.0 g/cm$^3$ due to the amount and density of the filler material, and preferably the wave absorbing structures have a density in excess of 2.0 g/cm$^3$, preferably between 2.5 and 4.0 g/cm$^3$.

A preferred manufacturing configuration of the present invention utilizes a heat-melt extruder having co-rotating twin screws whose barrel is vented and whose Length to Diameter (L/D) most preferably is in the range of 20:1-24:1 is utilized to manufacture the articles of the present invention. In mass production mode, said extruder will operate in a continuous extrusion mode with a commercially available vacuum-form attachment at the extruder's annulus. After having been shaped to their finished configuration by vacuum forming, the extruded articles pass through a cool-air/water-mist chamber and then fed by puller-rollers into a chilled water trough of sufficient length to cool the article to atmospheric temperatures. This high speed production mode is sometime referred to as "pull-trusion". A preferred extruder model such as describe hereinabove is that manufactured by Werner & Pfleiderer of Ramsey, N.J. In order to achieve the desired physical properties attained in the articles of the present invention, the extruder's screw must exert sufficient shear pressure to force the crystalline mineral (such as $CaSO_{4)}$ into close proximity of the thermoplastic polymer molecules.

In some instances, it may be advantageous to use a continuous mixer extruder to produce, for example, crossties of the present invention (and perhaps other products of the present invention as well). Continuous mixer extruders are commercially available from Bandbury, which sells a continuous bath mixer and Farrell, which sells a continuous mixer (which is a newer version).

In operation, the continuous mixer separates the mixing and pressurization functions. All mixing is done in the continuous mixer and the pressurization of the polymer (mix) is accomplished in a short, pumping extruder. In this way each function (mixing and extruding) is optimized for its specific role in the compounding process and mixing can be achieved at the lowest possible energy input levels.

The Farrell Continuous Mixer utilizes self-cleaning, counter-rotating, non-interlocking rotors. During operation it takes a starve feed of multiple ingredients and uses high shear to mix, disperse, and homogenize. The mixer runs in a partially filled condition and does not pressurize the polymer mix. The hot feed extruder receives the discharge from the mixer continuously and pumps the polymer mix through the die into the mold or into the vacuum former for profile production.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A railroad tie made by melt processing a thermoplastic composition consisting essentially of:
(a) a thermoplastic resin; and
(b) a calcium sulfate composition comprising a calcium sulfate present at a level of from 50 to 99 percent by weight based on the total weight of the calcium sulfate composition, and wherein the tie has substantially trapezoid-shape, a top and a bottom, and the bottom is broader than the top.

2. The tie of claim 1 wherein the thermoplastic resin is a polyolefin.

3. The tie of claim 1 wherein the thermoplastic composition also includes an epoxidized oil.

4. The tie of claim 3 wherein the thermoplastic composition includes the thermoplastic resin in an amount of from 40 to 75 percent by weight based on the total weight of the thermoplastic composition, the calcium sulfate composition in an amount of from 25 to 60 percent by weight based on the total weight of the thermoplastic composition, and the oil in an amount of from 0.5 to 2 percent by weight based on the total weight of the thermoplastic composition.

5. A process for making a railroad track, the process comprising:
   (a) providing a plurality of the ties of claim 1;
   (b) laying the ties on a raised rail bed; and
   (c) placing rail on the ties.

6. The tie of claim 1 wherein the tie include holes for receiving carriage bolts for securing rail to the tie.

7. The process of claim 5 wherein the composition comprises a yellow colorant.

8. The railroad tie of claim 1, wherein the melt processing is extrusion under high shear pressure.

9. A product made by the process of claim 5.

10. The tie of claim 1 wherein the composition comprises a yellow colorant.

11. The process of claim 5 wherein the ties include holes for receiving carriage bolts for securing the rail to the ties.

12. The tie of claim 1, wherein the tie is monolithic and homogenous.

13. The tie of claim 1, wherein:
    the composition comprises a yellow colorant,
    the tie includes holes for receiving carriage bolts for securing rail to the tie.

14. The tie of claim 2, wherein:
    the composition comprises a yellow colorant,
    the tie includes holes for receiving carriage bolts for securing rail to the tie.

15. The process of claim 5, wherein:
    the composition comprises a yellow colorant,
    the ties includes holes for receiving carriage bolts for securing the rail to the ties.

16. The tie of claim 1 wherein the thermoplastic composition includes the thermoplastic resin in an amount of from 40 to 75 percent by weight based on the total weight of the thermoplastic composition, and the calcium sulfate composition in an amount of from 25 to 60 percent by weight based on the total weight of the thermoplastic composition.

17. The tie of claim 16, wherein:
    the composition comprises a yellow colorant,
    the tie includes holes for receiving carriage bolts for securing rail to the tie.

18. A railroad tie made by melt processing a thermoplastic composition consisting essentially of:
    (a) a thermoplastic resin;
    (b) a calcium sulfate composition comprising a calcium sulfate present at a level of from 50 to 99 percent by weight based on the total weight of the calcium sulfate composition;
    (c) a yellow colorant; and
    (d) holes for receiving carriage bolts for securing rail to the tie, wherein:
    the tie has substantially trapezoid shape, a top and a bottom, and the bottom is broader than the top.

19. A railroad tie made by melt processing a thermoplastic composition consisting essentially of:
    (a) a thermoplastic resin in an amount of from 40 to 75 percent by weight based on the total weight of the thermoplastic composition; and
    (b) a calcium sulfate composition comprising a calcium sulfate present at a level of from 25 to 60 percent by weight based on the total weight of the calcium sulfate composition, wherein the tie has substantially trapezoid shape, a top and a bottom, and the bottom is broader than the top.

\* \* \* \* \*